US008059323B2

(12) United States Patent
Hornbeck

(10) Patent No.: US 8,059,323 B2
(45) Date of Patent: Nov. 15, 2011

(54) STABILIZER FOR MEMS DEVICES HAVING DEFORMABLE ELEMENTS

(75) Inventor: Larry Joseph Hornbeck, Van Alstyne, TX (US)

(73) Assignee: Texas Instruments Incorporated, Dallas, TX (US)

(*) Notice: Subject to any disclaimer, the term of this patent is extended or adjusted under 35 U.S.C. 154(b) by 84 days.

(21) Appl. No.: 12/344,467

(22) Filed: Dec. 27, 2008

(65) Prior Publication Data

US 2009/0168146 A1 Jul. 2, 2009

Related U.S. Application Data

(60) Provisional application No. 61/017,324, filed on Dec. 28, 2007.

(51) Int. Cl.
*G02B 26/08* (2006.01)
*G02B 26/00* (2006.01)

(52) U.S. Cl. .................................... 359/224.1; 359/290
(58) Field of Classification Search ............... 359/198.1, 359/224.1, 290, 291, 298
See application file for complete search history.

(56) References Cited

U.S. PATENT DOCUMENTS

| 6,552,991 | B1* | 4/2003 | Ishioka et al. ........... 369/112.29 |
| 6,600,591 | B2* | 7/2003 | Anderson et al. ............. 359/291 |
| 7,117,068 | B2* | 10/2006 | Critchlow ..................... 700/245 |
| 7,173,747 | B2* | 2/2007 | Yasuda et al. .............. 359/224.1 |

* cited by examiner

*Primary Examiner* — William Choi
(74) *Attorney, Agent, or Firm* — Charles A. Brill; Wade James Brady, III; Frederick J. Telecky, Jr.

(57) ABSTRACT

A stabilizer mechanism is coupled to a deformable element of a microelectromechanical device for reducing unwanted deformation of the deformable element by increasing the stiffness of the deformable element in selected other directions than the direction along which desired deformation is performed.

25 Claims, 21 Drawing Sheets

STABILIZER FOR MEMS DEVICES HAVING DEFORMABLE ELEMENTS

CROSS REFERENCE

This US utility patent application claims priority from co-pending U.S. provisional application "A STABILIZER FOR MEMS DEVICES HAVING DEFORMABLE ELEMENTS" to Larry Joseph Hornbeck, Ser. No. 61/017,324, filed Dec. 28, 2007, the subject matter of which is incorporated herein by reference in its entirety.

TECHNICAL FIELD OF THE DISCLOSURE

The technical field of this disclosure relates to the art of microstructures, and more particularly to microelectromechanical systems (MEMS) having deformable elements.

BACKGROUND OF THE DISCLOSURE

Microelectromechanical systems (MEMS) are a type of microstructure devices. A microelectromechanical system having a deformable or a flexible element (hereafter, "deformable element"), such as a deformable hinge, may suffer from performance degradation and even device failure when the deformable element experiences undesired or parasitic deformation, such as deformation along undesired directions.

Therefore, what is needed is a method to minimize or to eliminate unexpected deformations in microelectromechanical devices having deformable elements while substantially without sacrificing deformation ability in the desired direction.

SUMMARY

In one example, a microelectromechanical device is disclosed herein. The device comprises: a substrate; a deformable element held above the substrate such that the deformable element is capable of deforming along first and second directions; and a stabilizer attached to the deformable element so as to reduce the deformation capability of the deformable element along the first or the second direction, wherein the stabilizer is capable of moving when the deformable element deforms.

In another example, a device is disclosed herein. The device comprises: an array of micromirror devices, each of which comprises: a substrate; a hinge structure, comprising: an elongated deformable hinge held above the substrate; a stabilizer attached to the deformable hinge so as to increase the roll-stiffness of the deformable hinge, and wherein the stabilizer is capable of moving when the deformable hinge deforms; a reflective mirror plate attached to the deformable hinge such that the mirror plate is capable of moving above the substrate; and an electrode disposed approximate to the mirror plate for electrostatically deflecting the mirror plate.

In yet another example, a device comprises: a semiconductor substrate having formed thereon an electronic circuit; an electrode on the semiconductor substrate and in contact with the electronic circuit; a deformable hinge held above the substrate; a reflective mirror plate attached to the deformable hinge such that the mirror plate is capable of rotating above the substrate; and a single stopper disposed at a location such that the mirror plate is stopped by said single stopper at a specific angle when rotating along one direction.

In still yet another example, an imaging system comprises: an illumination system providing illumination light; a spatial light modulator comprising an array of micromirror device, each of which comprises: a substrate; a hinge structure, comprising: an elongated deformable hinge held above the substrate; a stabilizer attached to the deformable hinge so as to increase the roll-stiffness of the deformable hinge, and wherein the stabilizer is capable of moving when the deformable hinge deforms; a reflective mirror plate attached to the deformable hinge such that the mirror plate is capable of moving above the substrate; and an electrode disposed approximate to the mirror plate for electrostatically deflecting the mirror plate; and a set of optical elements for directing the illumination light onto or away from the spatial light modulator.

BRIEF DESCRIPTION OF DRAWINGS

FIG. 1b schematically illustrates the deformable hinge of the micromirror device in FIG. 1a;

FIG. 3b illustrates a cross-sectional view of the structure in FIG. 3a;

FIG. 9b schematically illustrates a side-view of the deformable hinge showing the roll-deformation along the length of the deformable hinge; wherein FIG. 9c schematically illustrates a side-view of the deformable hinge showing the sag deformation; and wherein FIG. 9d schematically illustrates an exemplary attaching scheme with the stabilizer being attached to the deformable hinge at attachment points that are substantially located at the midway of the deformable hinge;

DETAILED DESCRIPTION OF SELECTED EXAMPLES

Disclosed herein is a method for minimizing or eliminating unexpected deformation in microelectromechanical systems (hereafter, "MEMS", "MEMS device", or "MEMS devices") having deformable elements while substantially without sacrificing performance of desired deformation. The method is accomplished by attaching a stabilizer to the deformable element so as to limit the undesired deformation of the deformable element. The stabilizer and the deformable element can be at the same or different planes when the deformable element is at a natural resting state. In the example of a micromirror comprising a deformable element that is a deformable hinge, the stabilizer and the deformable hinge can be at the same or different planes when the deformable hinge is at a natural resting state and when it is viewed from the top of the deformable hinge.

The method in this disclosure is applicable to a wide range of MEMS devices having deformable elements, such as micromirror devices having deformable hinges, MEMS switches having deformable elastomeric elements, MEMS actuators/MEMS sensors having deformable elastomeric elements, MEMS diffraction gratings having deformable elements, and other MEMS devices. The deformable elements of the applicable MEMS devices may have different configurations, including but not limited to, geometric shapes (aspect ratios) and materials (combinations of materials). For example, the deformable element may be configured as a thin film or a plate or substrate with finite thickness as compared to the length or width. The deformable element may be formed therein or thereon other features as necessary, such as grooves, trenches, holes, cavities, and openings, such that one or more surfaces (including the top and bottom major surfaces and side surfaces/facets) may or may not be substantially flat surfaces. In fact, the deformable element can be configured such that a cross-section of the deformable element takes any desired shapes, such as closed-rectilinear polygons that can be convex and concave rectilinear polygons (e.g. rectangles), and closed-polygons of circular arcs, which can be circles and ellipses.

The deformable element may have any numbers of deformation directions (or deformation axes), the directions of which comprise desired deformation direction(s) and undesired deformation direction(s). A desired direction is a direction along which desired deformation of the deformable element is to be maintained. An undesired direction is a direction along which deformations of the deformable element are desired to be suppressed or eliminated.

In the following, the method will be discussed with reference to selected examples wherein the deformable element is a deformable hinge of a micromirror device. However, it will be appreciated by those skilled in that art that the following discussion is for demonstration purpose, and should not be interpreted as a limitation. Other variations within the scope of the disclosure are also applicable.

Figure 1A:
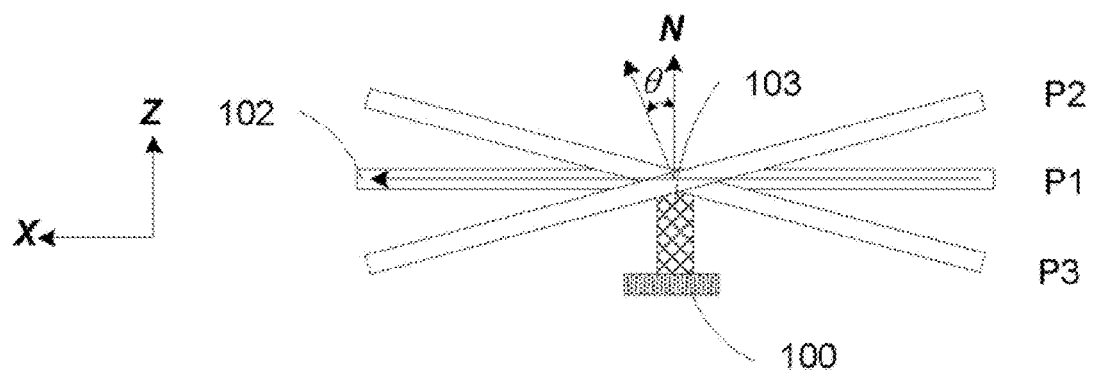
FIG. 1a illustrates a cross-sectional view of a portion of a micromirror device having a deformable hinge.

Referring to the drawings, FIG. 1a schematically illustrates a cross-sectional view in the X-Z plane of a deformable hinge (100) to which a reflective mirror plate (102) is attached through a mirror post (103) of an exemplary micromirror device. The deformable hinge enables the mirror plate to rotate to different positions, such as position $P_2$ wherein the mirror plate rotates counter-clockwise from the natural resting position $P_1$ by an angle of θ as indicated in FIG. 1a, and position $P_3$ wherein the mirror plate rotates clock-wise from the natural resting position.

Figure 1B:
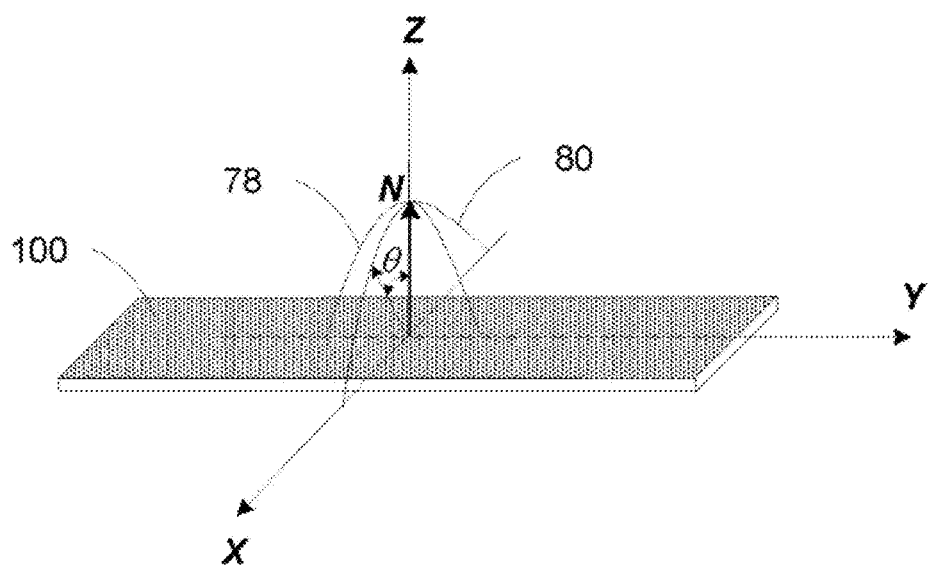

As the mirror plate rotates, the deformable hinge deforms along the desired direction(s), such as the elongated direction of the deformable hinge (Y axis). FIG. 1b schematically illustrates the deformable hinge around the attachment point (which can be the mass center or the geometric center of the deformable hinge) of the deformable hinge to the mirror post.

Referring to FIG. 1b, a Cartesian coordinate system is established with the origin at the geometric or mass center (which is the attachment point of the deformable hinge to the mirror post that connects the mirror plate to the deformable hinge) of the deformable hinge (100). The X direction is along the width of the hinge; the Y direction is along the length of the deformable hinge; and the Z direction is perpendicular to the deformable hinge at the natural resting state (not deformed) as illustrated in FIG. 1b. Normal vector N of the deformable hinge passes through the attachment point of the deformable hinge.

In general, the deformable hinge (100) comprises six degrees of freedom, which include translational movements along the X, Y, and Z axes; and rotations around the X, Y, and Z axes.

As the mirror plate (removed from FIG. 1b for simplicity) rotates to the desired positions, for example through an angle θ as shown in FIG. 1b, the deformable hinge deforms along desired directions such that the normal vector N rotates in the X-Z plane around the Y axis. Such deformation of the hinge is often referred to as "tilt," "tilt deformation," or "tilt movement." The solid curve in the X-Z plane schematically illustrates the trajectory of the normal vector N as the hinge deforms.

In addition to the desired deformation for the rotation of the mirror plate, the deformable hinge may experience undesired deformation along other directions (undesired directions). For example, the deformable hinge may deform in such a way that the normal vector N rotates in the Y-Z plane around the X axis, which is referred to as "roll movement" or "roll deformation." The deformable hinge may also deform along the Z direction, which is referred to as "sag" or "sag deformation." These undesired deformations, e.g. the roll deformation and sag deformation, degrade the performance of the micromirror, and may cause device failure. Undesired deformations can be more significant especially in micromirrors having single stopper for each rotation direction as compared to those with multiple stoppers, which will be discussed in the following with reference to FIG. 2.

Figure 2:
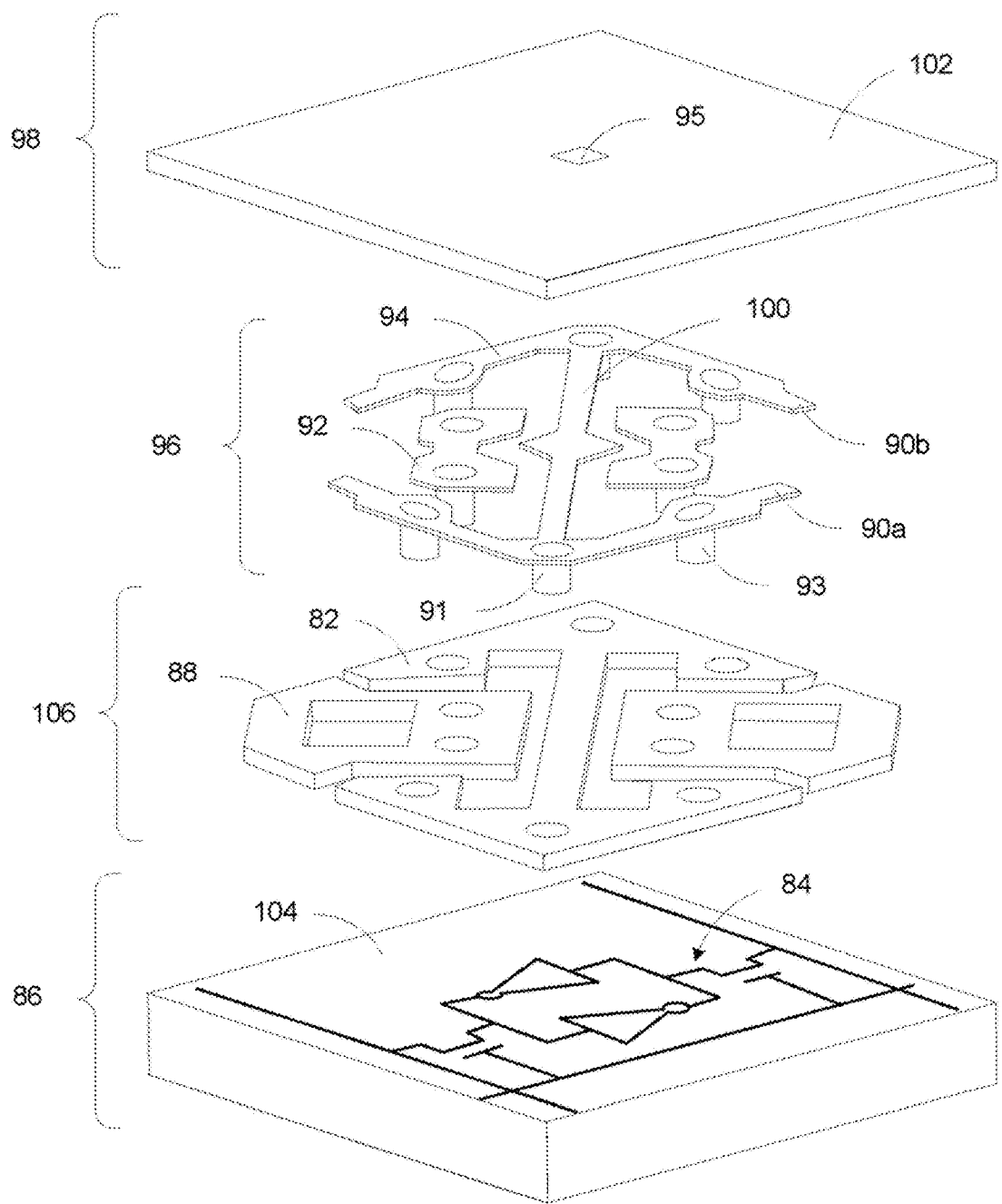
FIG. 2 illustrates a perspective view of an existing micromirror device having multiple stoppers for stopping the rotation of the mirror plate at one operational state.

FIG. 2 schematically illustrates an exemplary micromirror device with multiple stoppers for each rotation direction. In this example, reflective mirror plate 102 of mirror plate layer 98 is attached to deformable hinge 100 of hinge layer 96 through mirror post 95 (hidden under the mirror plate). The deformable hinge (100) is held by hinge supports (e.g. 94); and the hinge supports are held above hinge support pads (e.g. 82) of addressing electrode layer 106 by hinge support posts (e.g. 91) such that the deformable hinge is capable of deforming, which enables rotation of the mirror plate. For limiting the rotation of the mirror plate at desired rotational angles, stoppers are provided (e.g. 90a and 90b); and each are supported by a stopper post, such as stopper post 93 above addressing electrode layer 106. The electrode layer (106) is formed on substrate 104 of substrate layer 86.

Rotation of the mirror plate is accomplished by addressing electrode pads (e.g. 88) on electrode pad layer 106 and elevated addressing electrodes (e.g. 92) on the hinge layer (96). During operation, an electrostatic field can be established between the mirror plate and the addressing electrode, as well as the elevated electrode. The electrostatic field results in electrostatic torque to the mirror plate. Under the electrostatic torque, the mirror plate rotates in the in the X-Z plane around the Y axis (tilt direction) as illustrated in FIG. 1b.

Rotation direction of the mirror plate can be controlled by applying electronic voltages to different electrode pads and addressing electrodes using electronic circuitry 84 that is formed on substrate 104 of substrate layer 86. The rotation angles of the mirror plate, thus the operational states of the micromirror device, are often controlled by stoppers that abut against the mirror plate when the mirror plate is rotated to the desired angles. In the example as shown in FIG. 2, multiple stoppers are employed for each rotation direction of the mirror plate. For example, stoppers 90a and 90b are formed in the deformable hinge layer for stopping the rotation of the mirror plate along one direction (e.g. clockwise rotation). At the desired rotation angle, the stoppers abut against the mirror plate to stop the rotation of the mirror plate and maintain the mirror plate at the desired rotation angle.

The multi-stopper architecture for each rotation angle configuration, however, has disadvantages. For example, it limits scaling of the micromirror devices. As the micromirror device is scaled below, for example 10 microns, the electrostatic moment becomes too weak to sustain reliable operation because the multi-stoppers on either side of the rotation axis significantly reduce the available area for electrostatic fields. An approach to solve this problem is to reduce the number of stoppers, such as using a single stopper for each rotation direction i.e. a single stopper at either side of the rotation axis of the mirror plate. Examples of micromirror devices with single stopper for each rotation direction will be detailed afterward.

In addition to greater scalability, the single stopper for each rotation direction design has many other benefits, such as lower stiction forces. When the mirror plate is in contact with the stopper at the desired rotational angle, stiction (or adhesion) occurs at the contacting surfaces of the mirror plate and the stopper. Stiction is a result of the dominance of surface and interfacial forces, such as capillary, chemical bonding, electrostatic, and van der Waals forces, over mechanical and/or electrostatic forces which tend to separate the mirror plate and the stopper. When mechanical restoring forces and/or electrostatic forces cannot overcome adhesive forces, the microelectromechanical devices are said to suffer from stiction failure. Stiction can occur after the first contacting event (often referred to as initial stiction), or as a result of repeated contacting events (often referred to as in-use stiction). Initial stiction is often associated with surface contamination (e.g., residues of bonding materials or photoresist), or with high energy of contacting surfaces (e.g., clean oxidized silicon or metallic surfaces). For the case of in-use stiction, each time the mirror plate touches the stopper, the contact force grows and ultimately becomes too large for the restoring force to overcome. In this case, the micromirror device remains in one state indefinitely. This phenomenon can arise from a variety of underlying mechanisms, such as contact area growth, creation of a high-energy surface by micro-wear, surface charge separation etc. Therefore, reducing the contacting surfaces by reducing the number of stoppers in each rotation direction helps to reduce stiction of the mirror plate.

The single stopper for each rotational direction designs, however, exhibit less dynamic stability, particularly in the roll direction (e.g. the direction along the length of the deformable hinge) compared to multiple-stoppers designs. Roll instability due to deformation of the deformable hinge and the side roll of the mirror plate along the length of the deformable hinge may result in a) lower reset efficiency during launch, b) greater bounce during landing resulting in longer setting times, c) reduced solution space (the region of correct pixel functioning), and d) in extreme instances, electronic shorting to the raised electrodes during landing. Roll instability can be exacerbated by photo-mask misalignment in the roll direction during fabrication, and roll-angle variations created during the fabrication.

It is noted that roll instability not only exists in single stopper designs, but may also exist in multi-stoppers designs. For example, in the two-stopper design as illustrated in FIG. 2, the mirror plate may still roll along the length of the deformable hinge during the landing to stopper 90a and 90b, during the settling of the mirror plate at the stoppers, or during departing from the stoppers, especially when the two stoppers 90a and 90b are improperly positioned, such as too close to each other. When the multiple stoppers are improperly positioned relative to the mirror plate, the stoppers may not act on the mirror plate at the same time, or the actions of different stoppers to the rotating mirror plate may not be balanced or synchronized—resulting in rolling of the mirror plate. For example, the mirror plate may still be approaching one of the two stoppers while the other stopper already contacts the mirror plate. In another example, the mirror plate may roll along the length of the deformable hinge even though both stoppers contact the mirror plate. A portion of the mirror plate may intend to depart from one stopper, while another portion of the mirror plate is still approaching or landing to the other stopper. All the above examples, as well as other examples, cause roll instability of the micromirror.

To increase the stability, especially the roll stability, of the micromirror device, deformation of the deformable hinge is intentionally adjusted by attaching a hinge stabilizer such that deformation of the deformable hinge along undesired directions are minimized or eliminated while without substantially sacrificing performance of the desired deformation of the deformable hinge.

Figure 3A:
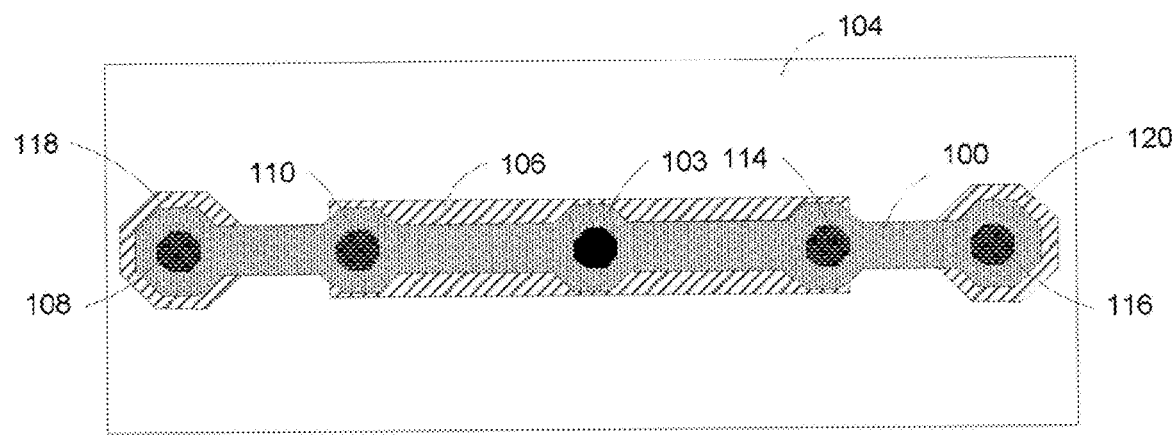
FIG. 3a illustrates in a top view of an exemplary deformable hinge with a stabilizing mechanism that is provided for minimizing or eliminating unexpected deformation of the deformable hinge.

FIG. 3a schematically illustrates a top view of an exemplary hinge stabilizer attached to an exemplary deformable hinge of a micromirror device. For simplicity purpose, other components, such as the mirror plate that is attached to the deformable hinge through mirror post 103, the underneath electrode pads, and other features are removed. In this example, deformable hinge 100 is held above substrate 104 by affixing both ends of the elongated deformable hinge (100) to the top surfaces of hinge posts 118 and 120 using posts 108 and 116, which is better illustrated in the cross-sectional view in FIG. 3b. To reduce the roll instability of the deformable hinge (100), hinge stabilizer 106 is attached to the deformable hinge (100) by posts 110 and 114 as illustrated in FIG. 3a.

In this exemplary configuration, the stabilizer (106) is a stabilizer plate disposed underneath (at a plane between substrate 104 and deformable hinge 100) the deformable hinge (100); and is aligned to the elongated deformable hinge such that the length of the stabilizer is substantially parallel to the length of the deformable hinge; and the plane of the stabilizer plate is substantially parallel to the plane of the deformable hinge when the deformable hinge is at a natural resting state. A stabilizer disposed with the length substantially along and coincident to the length of the deformable hinge when viewed from the top at a natural resting state is referred to as an "inline stabilizer." In other examples, an elongated stabilizer can be attached and aligned to the deformable hinge such that the lengths of the deformable hinge and the elongated stabilizer are not parallel. Such an elongated stabilizer is referred to as an "offline stabilizer."

Figure 3B:
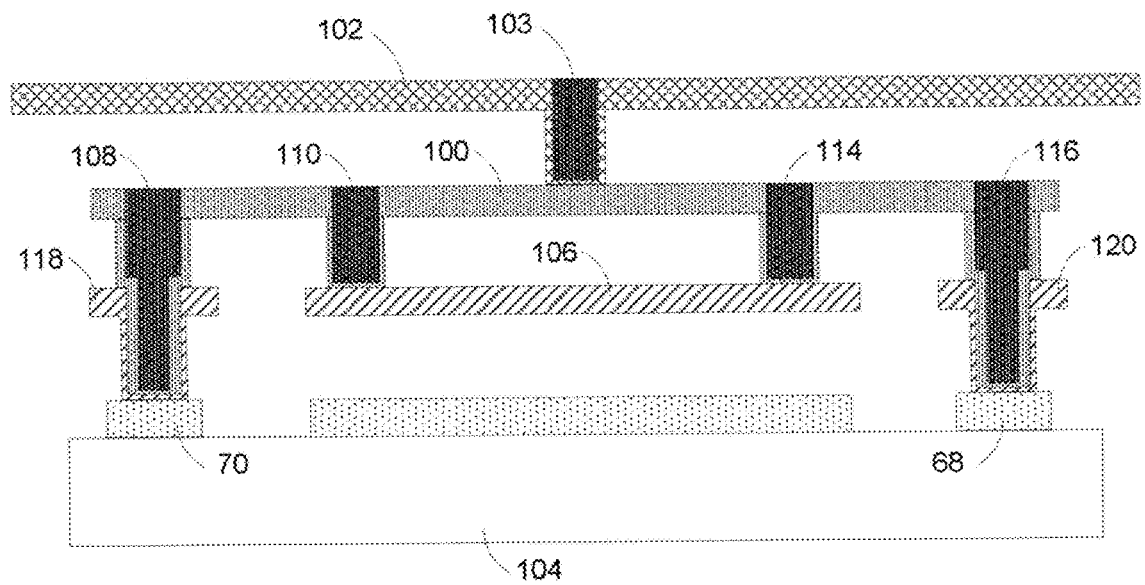

A cross-sectional view taken along the length of the deformable hinge of the micromirror in FIG. 3a is schematically illustrated in FIG. 3b. As can be seen in FIG. 3b, deformable hinge 100 is attached to hinge posts 108 and 116 at both ends of the elongated deformable hinge. The hinge posts 108 and 116 are respectively formed on posts 118 and 120. Posts 118 and 120 are respectively formed on electrode pads 70 and 68 of the electrode layer that is formed on substrate 104. Hinge stabilizer 106 is attached to deformable hinge 100 by posts 110 and 114 such that a gap (e.g. an air gap) is formed between deformable hinge 100 and stabilizer 106. The vertical dimension of the air gap, which is determined by the height(s) of posts 110 and 114, can be of any suitable values, such as from 50% to 100 times the thickness of the deformable hinge, or from 10 times to 20 times the thickness of the deformable hinge. The mirror plate (102) is attached to deformable hinge 100 through mirror post 103.

In the example shown in FIG. 3a and FIG. 3b, the stabilizer (106) is attached to the deformable hinge (100) such that the attachment points 110 and 114 each are substantially at midway of the deformable hinge. Specifically, the attachment point 110 is substantially at the mid-pointy between mirror plate attachment point 103 and the hinge post 108. The attachment point 114 is substantially at the mid-pointy between mirror plate attachment point 103 and the hinge post 116. In other examples, the stabilizer can be attached to the deformable hinge with the attachments being at any suitable locations. For example, the attachment points of the stabilizer to the deformable hinge can be at the maximum displacement point of the deformable hinge, which will be discussed afterwards with reference to FIG. 9a through FIG. 9d. In the example as illustrated in FIG. 3a and FIG. 3b, the stabilizer is disposed underneath the deformable hinge (e.g. between the substrate and the deformable hinge) and attached to the deformable hinge from below. In an alternative configuration, the stabilizer can be formed above the deformable hinge and attached to the deformable hinge such that the deformable hinge is between the stabilizer and the substrate, which is not illustrated herein.

The hinge stabilizer (106) can be attached to the deformable hinge in a way such that the geometric center of the hinge stabilizer is substantially aligned to the geometric center of the above deformable hinge (e.g. at the location of mirror plate post 103); and posts 110 and 114 are substantially equally distanced on the opposite sides of the geometric center of the deformable hinge. Such uniform configuration can be of more importance for deformable hinges with uniform mass distributions, or hinges whose mass centers are substantially aligned to the geometric centers. In some examples wherein the mass centers of the deformable hinges are away from the geometric centers, the geometric center can be aligned to the mass centers. When necessary, the hinge stabilizer may have non-uniform mass distributions along the length. In this instance, the hinge stabilizer can be aligned to the above deformable hinge in any suitable ways as desired to satisfy specific expectations, such as dynamically balancing the mechanical movement of the deformable hinge.

Depending upon the configurations (e.g. mass distribution and geometries) of the deformable hinge and the hinge stabilizer, posts (attachment points) 110 and 114 can be displaced at any suitable locations while connecting to both the deformable hinge and the hinge stabilizer.

Even though two posts 110 and 114 are shown in FIG. 3a and FIG. 3b for attaching the hinge stabilizer to the deformable hinge, other suitable numbers of such posts can be applicable because the different numbers of posts connected to the deformable hinge also affect the deformability of the deformable hinge. The posts can be deployed in the gap between the deformable hinge and the hinge stabilizer in any suitable ways, such as aligned to straight line parallel to the length of the deformable hinge.

The hinge stabilizer in this example is substantially a rectangular plate with a thickness from 10% to 500% thickness of the deformable hinge, such as from 50% to 100% thickness of the deformable hinge or can be any suitable values. The hinge stabilizer may have other thickness values depending upon the profile (e.g. geometric dimension and material) of the deformable hinge. The hinge stabilizer (106) may have any suitable geometric dimensions. For example, the hinge stabilizer may have a length (along the length of the deformable hinge) of any suitable values but less than the length of the deformable hinge, such as from ⅓ to ⅘ length of the deformable hinge, and more preferably around ½ length of the deformable hinge. The width of the hinge stabilizer can also be of any selected vales, such as from ⅓ to 10 times the average width of the deformable hinge, more preferably around the average width of the deformable hinge.

The hinge stabilizer can comprise any suitable materials that may or may not be the same as the material(s) of the deformable hinge. Because the geometric dimension and the material are major factors for the mechanical property of the hinge stabilizer, the stabilizer can be selected from a wide range of possible materials, such as electronically insulating, semi-insulating, conducting, or semi-conducting materials. In particular, the material for the hinge stabilizer is preferably resistant to the etchant (e.g. interhalogens and noble gas halides) or etching processes (e.g. dry etch, wet etch, energized etch, and non-energized etch) employed for removing sacrificial materials during fabrications. Examples of materials for the hinge stabilizer can be metal elements (e.g. Al, Ir, Ti, Ag, W, Ta and Mo), metal alloys (e.g. $WTi_x$, $WMo_x$, and $WTa_x$), metal compounds (e.g. $WAl_x$, $AlTi_x$) including metal silicides (e.g. $AlSi_x$, $WSi_x$, $MoSi_x$, $TiSi_x$, $ZrSi_x$, $CrSi_x$, $TaSi_x$, $AlSi_xCu_y$, and $TiW_xSi_y$) and metal nitrides, ceramic materials (e.g. silicon nitride, silicon carbide, polysilicon, titanium nitride, titanium oxide(s), titanium carbide, $CoSi_xN_y$, $TiSi_xN_y$, $TaSi_xN_y$, or other ternary and higher compounds), and other suitable materials.

Figure 4:
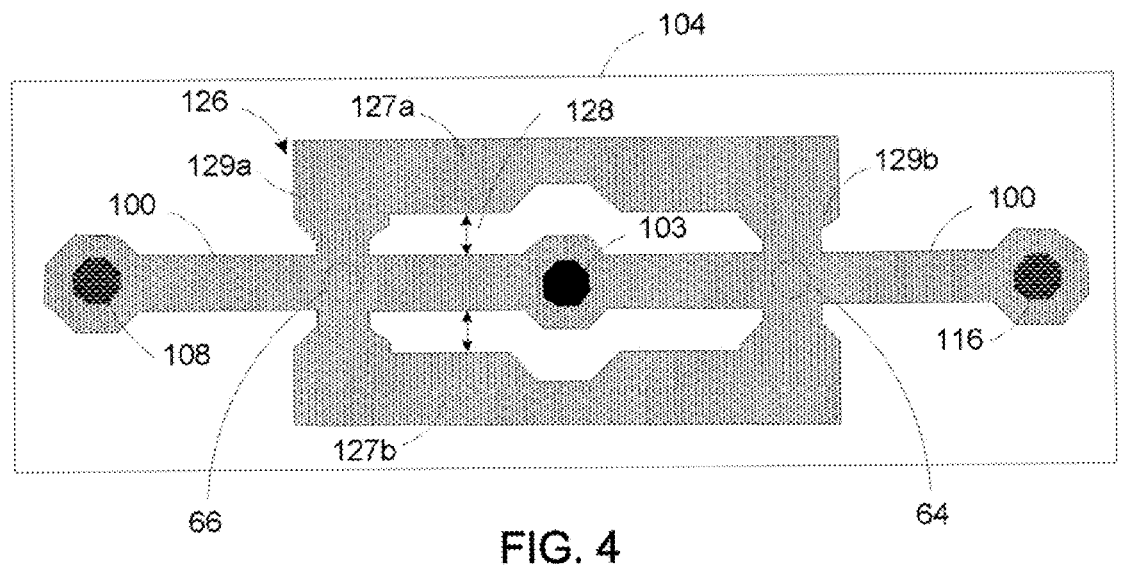
FIG. 4 illustrates a top view of another exemplary deformable hinge with a stabilizing mechanism that is provided for minimizing or eliminating unexpected deformation of the deformable hinge.

Other than forming the hinge stabilizer on a separate plane underneath the deformable hinge, it can be formed in the same plane of the deformable hinge when the deformable hinge is at a natural resting state, as schematically illustrated in FIG. 4. Referring to FIG. 4, stabilizer frame 126 is formed as a frame comprising frame wings 127a and 127b, and side wings 129a and 129b. The stabilizer frame is substantially in the same plane as the deformable hinge (100) when the deformable hinge is at a natural resting state (e.g. not deformed). The side wings 129a and 129b of the stabilizer frame are connected to the elongated deformable hinge (100) at attachment points 66 and 64 (which are illustrated as dashed circles in the figure) such that frame sides 129a and 129b extend orthogonal to the length of the deformable hinge as illustrated in the figure. The frame wings 127a and 127b of the frame are disposed on the opposite sides of the deformable hinge and are substantially parallel (though not necessarily) to the length of the deformable hinge. To enable the desired deformation, an air gap, such as wing air gap 128, is formed between each one of the frame wings 127a and 127b and the deformable hinge. The deformable hinge, along with the stabilizer frame (126) is attached to substrate 104 with hinge posts 108 and 116 at the ends of the deformable hinge. As a result, the deformable hinge is capable of deforming above substrate 104; and the mirror plate (removed from the figure for simplicity), which is attached to the deformable hinge with mirror post (103) can rotate above substrate 104.

The stabilizer frame (126) can be aligned to the deformable hinge in many ways, such as those discussed above for hinge stabilizer 106 with reference to FIG. 3a and FIG. 3b. In particular, the mass center or the geometric center of the stabilizer frame can be aligned to the mass center or the geometric center of the deformable hinge.

The stabilizer frame may have any suitable dimensions. For example, the stabilizer frame may have a width (the shorter major sides) from 1.5 times to 10 times the width of the deformable hinge, more preferably from 2 times to 8 times, or around 4 times the width of the deformable hinge. The length (the longer major sides) may be from ⅓ to ⅘ length of the deformable hinge, and more preferably around ½ length of the deformable hinge. The thickness of the stabilizer frame may be from 10% to 500% thickness of the deformable hinge, such as from 50% to 100% thickness of the deformable hinge. The hinge stabilizer may have other thickness values depending upon the profile (e.g. geometric dimension and material) of the deformable hinge, as discussed above for hinge stabilizer 106 with reference to FIG. 3a and FIG. 3b. The wings on each major side of the stabilizer frame can be selected to satisfy the expected mechanical property of the stabilizer frame, as well as the deformable hinge. For example, the margin on each major side of the stabilizer frame may have a width from 0.5 to 2 times the width of the deformable hinge.

The wing air gap (e.g. gap 128) between each longer major side of the stabilizer frame and the deformable hinge preferably has a width (in the direction orthogonal to the length of the deformable hinge) that is equal to or larger than the thickness of the deformable hinge to avoid contact between the longer side margin and the edge of the deformable hinge.

Because the stabilizer frame is formed on the same plane as the deformable hinge, it is preferred that the stabilizer frame is composed of the same material(s) as the deformable hinge so as to simplify the fabrication and design. In particular, the stabilizer frame (126) can be electrically activated so as to contribute an electrostatic moment induced as its connection point(s) to the deformable hinge when the deformable hinge performs desired deformation. In other examples, the stabilizer frame (126) can have any other suitable material(s) as those for hinge stabilizer 106 discussed above with reference to FIG. 3a and FIG. 3b.

The stabilizer frame of the example as illustrated in FIG. 4 is connected only to the deformable hinge; and the geometric (and/or mass distribution), as well as the connection of the stabilizer to the deformable hinge, determines the deformation property of the deformable hinge. In other examples, the stabilizer frame can be attached to a stabilizer plate (129) that is formed on the separate plane underneath the deformable hinge, as schematically illustrated in FIG. 5.

Figure 5:
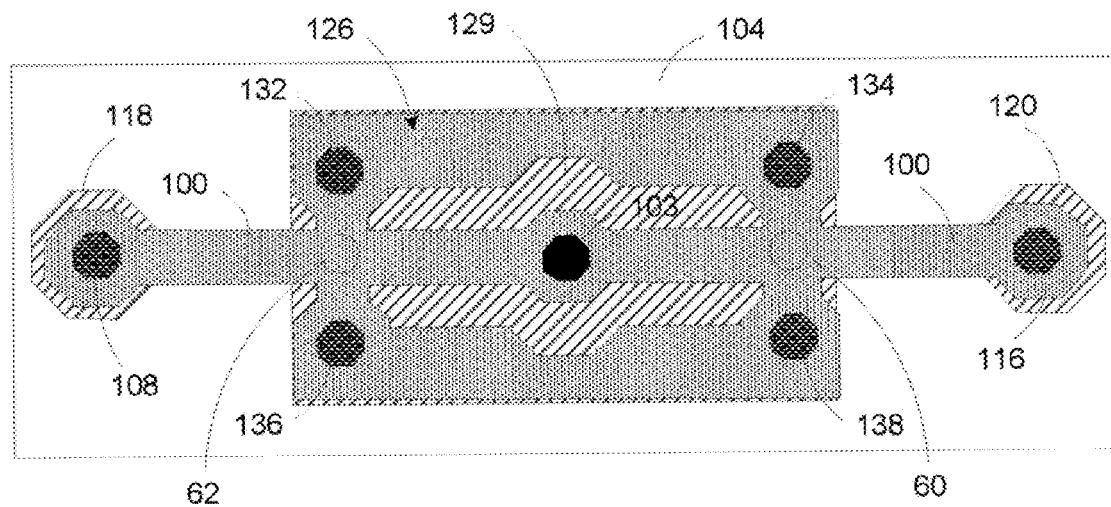
FIG. 5 illustrates a top view of yet another exemplary deformable hinge with a stabilizing mechanism that is provided for minimizing or eliminating unexpected deformation of the deformable hinge.

Referring to FIG. 5, stabilizer plate 129, which can be the same as inline hinge stabilizer 106 as discussed above with reference to FIG. 3a and FIG. 3b, is provided. However, the inline stabilizer (129) is not directly attached to the deformable hinge, but instead is attached to stabilizer frame 126.

Stabilizer plate 129 in this example has a shape that substantially matches the outmost profile of stabilizer frame 126, though it is not required. The stabilizer frame (126) is attached to the stabilizer plate (129) by posts, such as posts 132, 134, 136, and 138 at the major corners of the stabilizer frame as illustrated in FIG. 5. The stabilizer frame (126) can be attached to the deformable hinge at attachment points 62 and 60 in a way as discussed above with reference to FIG. 4, which will not be repeated herein. In another example, the inline stabilizer (129) can also be directly attached to the deformable hinge, for example, in a way as discussed above with reference to FIG. 3a and FIG. 3b. Other than forming the inline stabilizer underneath the deformable hinge as illustrated in FIG. 5, the inline stabilizer (129) can be formed above the deformable hinge. Specifically, the inline stabilizer can be formed between the deformable hinge and the reflective mirror plate, which is not illustrated in the figure.

Figure 6:
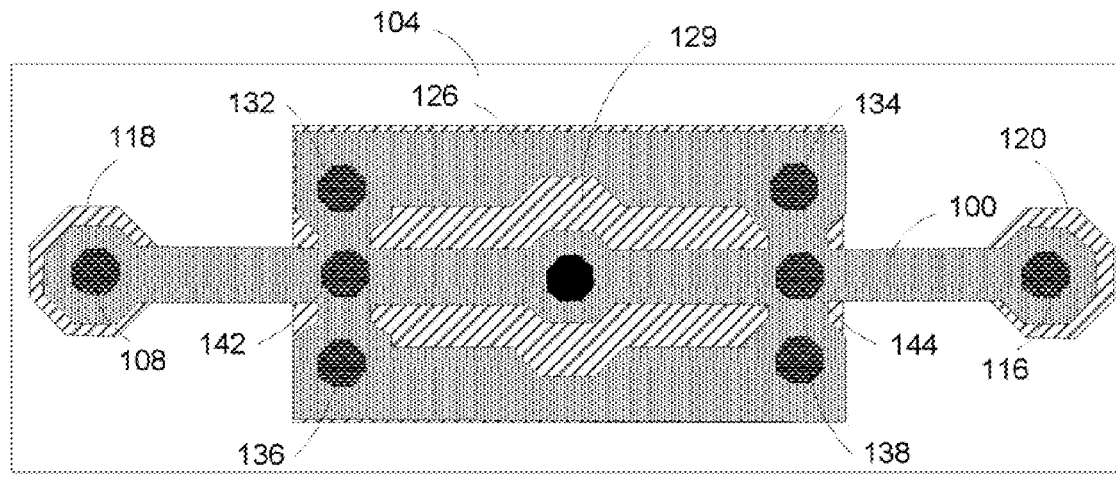
FIG. 6 illustrates a top view of yet another exemplary deformable hinge with a stabilizing mechanism that is provided for minimizing or eliminating unexpected deformation of the deformable hinge.

As an alternative to anchoring the stabilizer frame (126) to the stabilizer plate (129) at the corners of the stabilizer frame, the connection point(s) of the stabilizer frame and the deformable hinge can also be posted to the stabilizer plate (129) as illustrated in FIG. 6. Referring to FIG. 6, the connection points of the stabilizer frame to the deformable hinge (100) are also attached to the underneath stabilizer plate (129) by posts 142 and 144.

Figure 7:
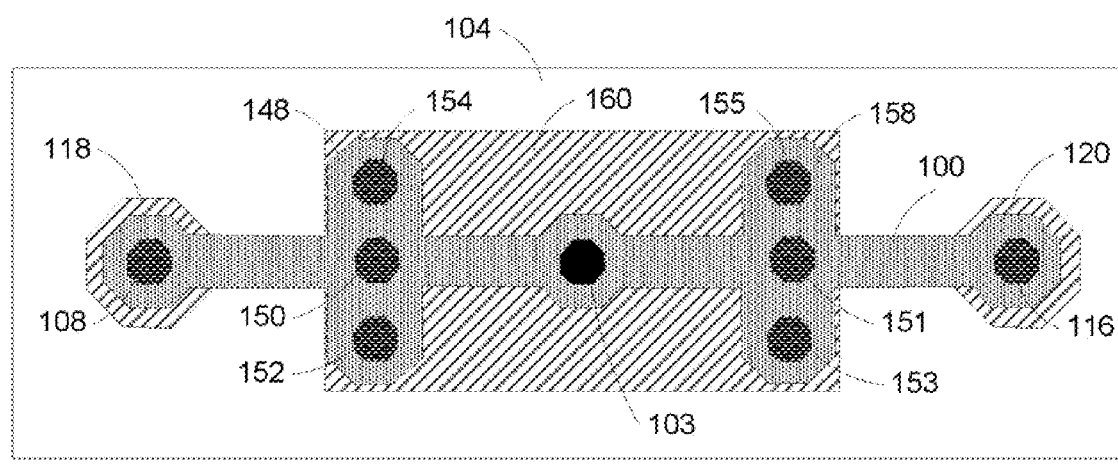
FIG. 7 illustrates a top view of yet another exemplary deformable hinge with a stabilizing mechanism that is provided for minimizing or eliminating unexpected deformation of the deformable hinge.

FIG. 7 schematically illustrates another exemplary hinge stabilizing mechanism. Referring to FIG. 7, stabilizer plate 160, which can be the same as hinge stabilizer 106 as discussed above with reference to FIG. 3a and FIG. 3b, or stabilizer plate 129 as discussed above with reference to FIG. 5, is disposed at a plane underneath the deformable hinge (100). Stabilizer plate 160 is attached to hinge extension arms 148 and 158. The hinge extension arms extend from the deformable hinge in the same plane of the deformable hinge along a direction orthogonal to the length of the deformable hinge. Although in FIG. 7 the hinge extension arms are schematically illustrated as straight strips, this is only one of many possible examples. The hinge extension arms may have any desired shapes, such as a "U" shape. Other suitable numbers of hinge extension arms other than two are also applicable.

In the example illustrated in FIG. 7, each hinge extension arm is attached to the stabilizer plate (160) by three posts, such as posts 154, 150, and 152 for hinge extension arm 148, while posts 154 and 152 are at the opposite ends of the hinge extension arm; and post 150 is at the connection point of the hinge extension arm to the deformable hinge. Hinge extension arm 158 is also connected to stabilizer plate (160) through posts 155, 151, and 153. The hinge arms 148 and 158 are attached to the deformable hinge (100) at the attachment points 150 and 151 as schematically illustrated in FIG. 7.

The two hinge extension arms (148) and 158 may or may not be symmetrically disposed along the hinge on opposite sides of mirror post 103 wherein the mirror plate (removed from simplicity) is attached to the deformable hinge. In other examples, the two (or more if provided) hinge extension arms can be disposed asymmetrically around mirror post 103 or in any suitable arrangements. The hinge extension arms (148 and 158) may be substantially the same except their attachments to the deformable hinge. Alternatively, hinge extension arms of different geometric shapes and/or materials can be employed; and can be attached to the deformable hinge in different ways.

Figure 8:
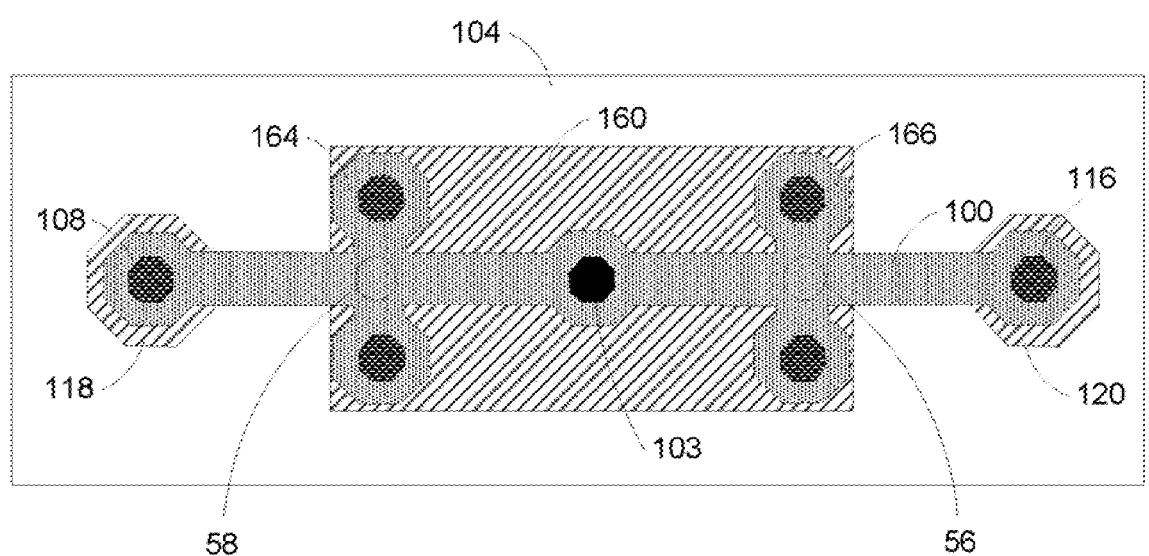
FIG. 8 illustrates a top view of yet another exemplary deformable hinge with a stabilizing mechanism that is provided for minimizing or eliminating unexpected deformation of the deformable hinge.

FIG. 8 schematically illustrates another example wherein hinge extension arms have different geometric shapes and attached to a stabilizer plate in a different way than that illustrated in FIG. 7. Referring to FIG. 8, two dumbbell-shaped hinge extension arms (164 and 166) each extend from the deformable hinge along a direction perpendicular to the length of the deformable hinge and in the same plane as the deformable hinge. The hinge extension arms 164 and 166 are attached to the deformable hinge at attachment points 58 and 56, respectively. The "bells" of each hinge extension arm are disposed at different sides of the deformable hinge with the center of the dumbbell extension arm being substantially at the deformable hinge. The two dumbbell shaped extension arms are symmetrically disposed along the hinge on opposite sides of the mirror post (103) wherein the mirror plate (removed for simplicity) is attached to the deformable hinge. It is noted that the crossing-points of the hinge extension arms and the deformable hinge are not attached to the underneath stabilizer plate (160). In other examples, the crossing points can be attached to the underneath stabilizer plate.

It noted that FIG. 3a through FIG. 8 as discussed above illustrate only some of many possible configurations of hinge stabilizing mechanisms for reducing unwanted deformations or for improving the desired stabilities along specific direction(s) of deformable hinges in MEMS devices. Different configurations of the stabilizing mechanisms, such as different geometric shapes, materials, and attachment ways may result in different stabilizing effects to the deformable hinges. In a simplified modeling analysis, a deformable hinge can be modeled as a one dimensional line with specific elasticity and mass distribution, such as a uniform distribution; and the posts attaching the one dimensional deformable hinge to other components (e.g. stabilizer and hinge posts) can be treated as movement constraints. Such a simplified model is schematically illustrated in FIG. 9a through FIG. 9d. The coordinate system used in these schematic illustrations is the same as the one used in FIG. 1b.

Figure 9A:
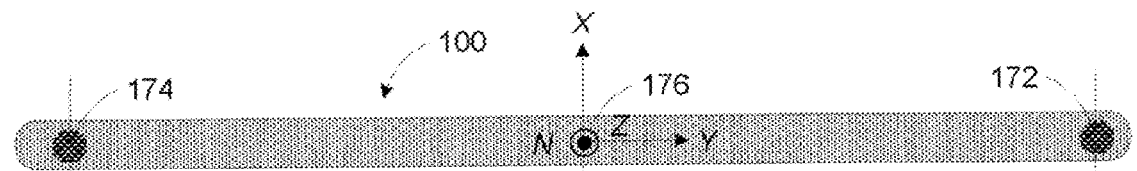
FIG. 9a through FIG. 9d demonstrate a mathematical model, wherein FIG. 9a schematically illustrates a top view of a deformable hinge.

FIG. 9a schematically illustrates a plan view of a simplified deformable hinge (100) with the two ends being anchored by hinge posts 172 and 174 such that the ends of the deformable hinge are fixed without movements. The geometric or mass center of the deformable hinge is attached thereto a mirror plate post (176) that connects the mirror plate (removed for simplicity) to the deformable hinge. Investigations of the roll deformation (normal vector N rotates in the Y-Z plane around the X axis) and the sag deformation (displacement along the minus Z axis) of the deformable hinge are separately performed as schematically illustrated in FIG. 9b and FIG. 9c.

Figure 9B:
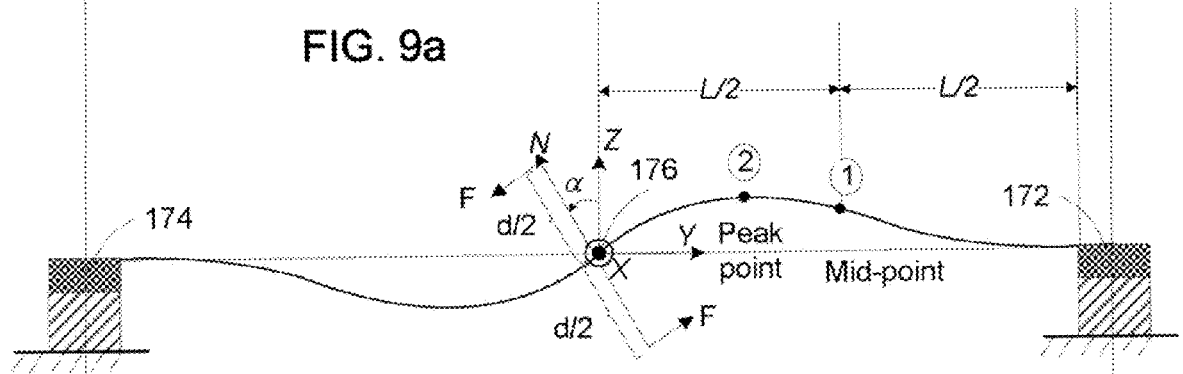
Figure 9C:
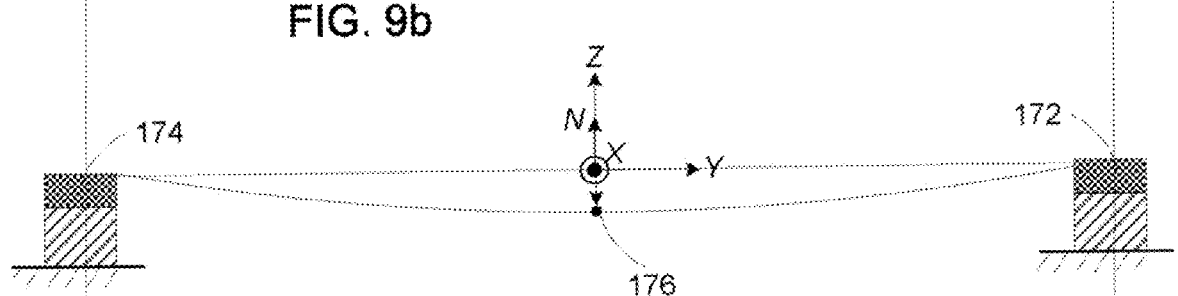

FIG. 9b schematically illustrates a cross-sectional view of the deformable hinge. The dashed line connecting the hinge posts 174 and 172 represents the deformable hinge at the natural resting state (without being deformed). In order to simulate the pure roll deformation of the deformable hinge, a force couple (F) is applied to the deformable hinge around the center point (176) as illustrated in FIG. 9b. The force couple, consisting of the parallel forces F and −F, separated by a moment arm D, acts to produce pure rotation about the center point 176. The force couple produces a twisting moment of magnitude Fd. Under the twisting moment Fd, the normal vector N rotates in the Y-Z plane around the X axis through a roll angle of α, and the deformable hinge undergoes a roll deformation along the length of the deformable hinge for which the distribution of displacements is schematically illustrated in FIG. 9b. As can be seen in FIG. 9b, the maximum displacement point (peak point ②) is away from the mid-point ①, and is specifically located between the mid-point ① and the center point 176. An attachment point, such as attachment points 110 and 114 in FIG. 3a, attachment points 64 and 66 in FIG. 4, attachment points 60 and 62 in FIG. 5, attachment points 142 and 144 in FIG. 6, attachment points 150 and 151 in FIG. 7, and attachment points 56 and 58 in FIG. 8, of the deformable hinge to a stabilizer mechanism can be at the location of the deformable hinge corresponding to the peak point or at the mid-way point, or alternatively, at other desired points. It is noted that in the presence of other attachments and a stabilizer mechanism, the curve may change.

Figure 9D:
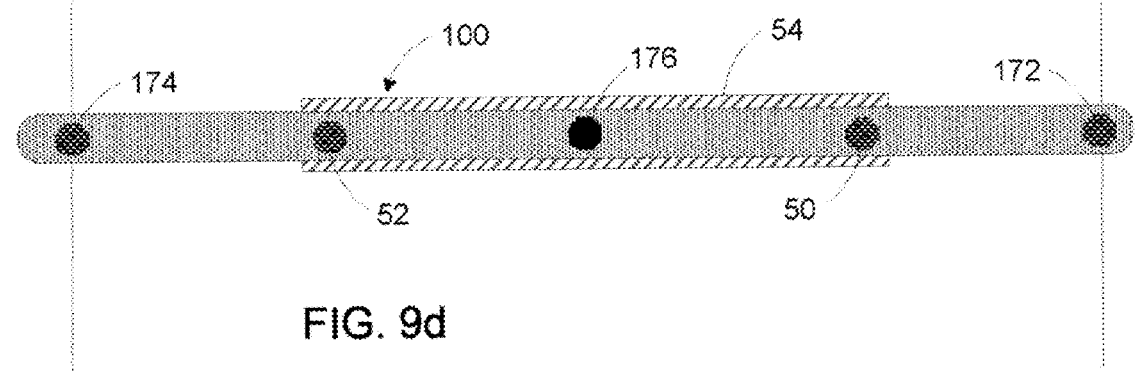

The sag deformation is investigated separately from the above roll deformation investigation. FIG. 9c schematically illustrates an exemplary investigation of the sag deformation in the deformable hinge illustrated in FIG. 9a. Referring to FIG. 9c, the sag deformation along the vertical direction (e.g. along the Z axis in the Cartesian coordinate system in FIG. 1b) is caused by applying a force in the direction along the negative Z direction (e.g. downward) and at the point 176 of the deformable hinge. For demonstration purpose, FIG. 9d schematically illustrates an exemplary attaching scheme wherein stabilizer 54 (which can be an inline stabilizer as discussed above with reference to FIG. 3a) is attached to deformable hinge 100 at attachment points 52 and 50. Each one of the attachment points 52 and 50 can be substantially at the mid-point ① of the deformable hinge on the opposite sides of mirror plate attachment point 176.

Table 1 presents the above investigation results. The torsional stiffness is the stiffness of the deformable hinge to the torsion deformation (tilt deformation). The sag stiffness is the stiffness of the deformable hinge to the sag deformation; and the roll stiffness is the stiffness of the deformable hinge to the roll deformation. Stabilizers formed on a separate plane from the deformable hinges are given the same thickness as the deformable hinge. The results in Table 1 are scaled relative to the standard deformable hinge (torsional stiffness=1, sag stiffness=1, and roll stiffness =1). In Table 1, "type A" refers to the stabilizer configuration in FIG. 3a; "type B" refers to the stabilizer configuration in FIG. 4; "type C" refers to the stabilizer configuration in FIG. 7; and "type D" refers to the stabilizer configuration in FIG. 6. "1" refers to the mid-way point in FIG. 9 and "2" refers to the peak displacement point in FIG. 9.

TABLE 1

| | Design type | | | | | |
|---|---|---|---|---|---|---|
| | Torsional stiffness | | Sag stiffness | | Roll stiffness | |
| | Standard hinge | | | | | |
| | 1.0 | | 1.0 | | 1.0 | |
| | Attachment points 1 = mid-way 2 = peak point | | | | | |
| | 1 | 2 | 1 | 2 | 1 | 2 |
| Type A | 1.17 | 1.17 | 5.36 | 3.15 | 2.02 | 2.25 |
| Type B | 1.09 | 1.11 | 1.73 | 1.66 | 1.72 | 1.84 |
| Type C | 1.21 | 1.21 | 5.68 | 3.30 | 2.51 | 2.82 |
| Type D | 1.21 | 1.21 | 5.70 | 3.30 | 2.59 | 2.91 |

It can be seen from Table 1 the highest roll stiffness is attained for attachment point 2 (the peak point); and the highest sag stiffness is attained for attachment point 1 (mid-way point). A roll stiffness of nearly 3 times the standard deformable hinge without a stabilizer is achieved by type D configuration with the attachment at attachment point 2. It is noted that the torsion stiffness, sag stiffness, and the roll stiffness may not be optimized at the same time for a specific deformable hinge with a stabilizer mechanism. In fact, less optimized values can be valuable in other performance aspects. For example, less optimized sag stiffness can be helpful for reducing the settle time of the mirror plate at a stopper during landing to the stopper. In a specific design for a deformable hinge and stabilizer mechanism, torsional stiffness, sag stiffness, and roll stiffness may be among many other major factors relevant to the desired performance. In this regard, the torsional stiffness, sag stiffness, and roll stiffness each may have any suitable values, which may or may not be the optimized values, so as to satisfy specific expectations of the overall performance of the deformable hinge and/or the MEMS device having the deformable hinge and a stabilizer mechanism.

Also it can be seen in Table 1 that the torsional stiffness is at most increased by a factor of 1.21 for any of the stabilizer types or attachment points. Regardless of different configurations of the stabilizer and their attachments to the deformable hinges, it is preferred that the stabilizer, as well as its attachment to the deformable hinge reduces or eliminates deformation along undesired direction(s); while substantially without sacrificing the deformation along the desired direction(s).

The stabilizer mechanism as discussed above with reference to FIG. 3a through FIG. 8 can be implemented in micromirror devices in many ways as will be discussed in the following.

Figure 10:
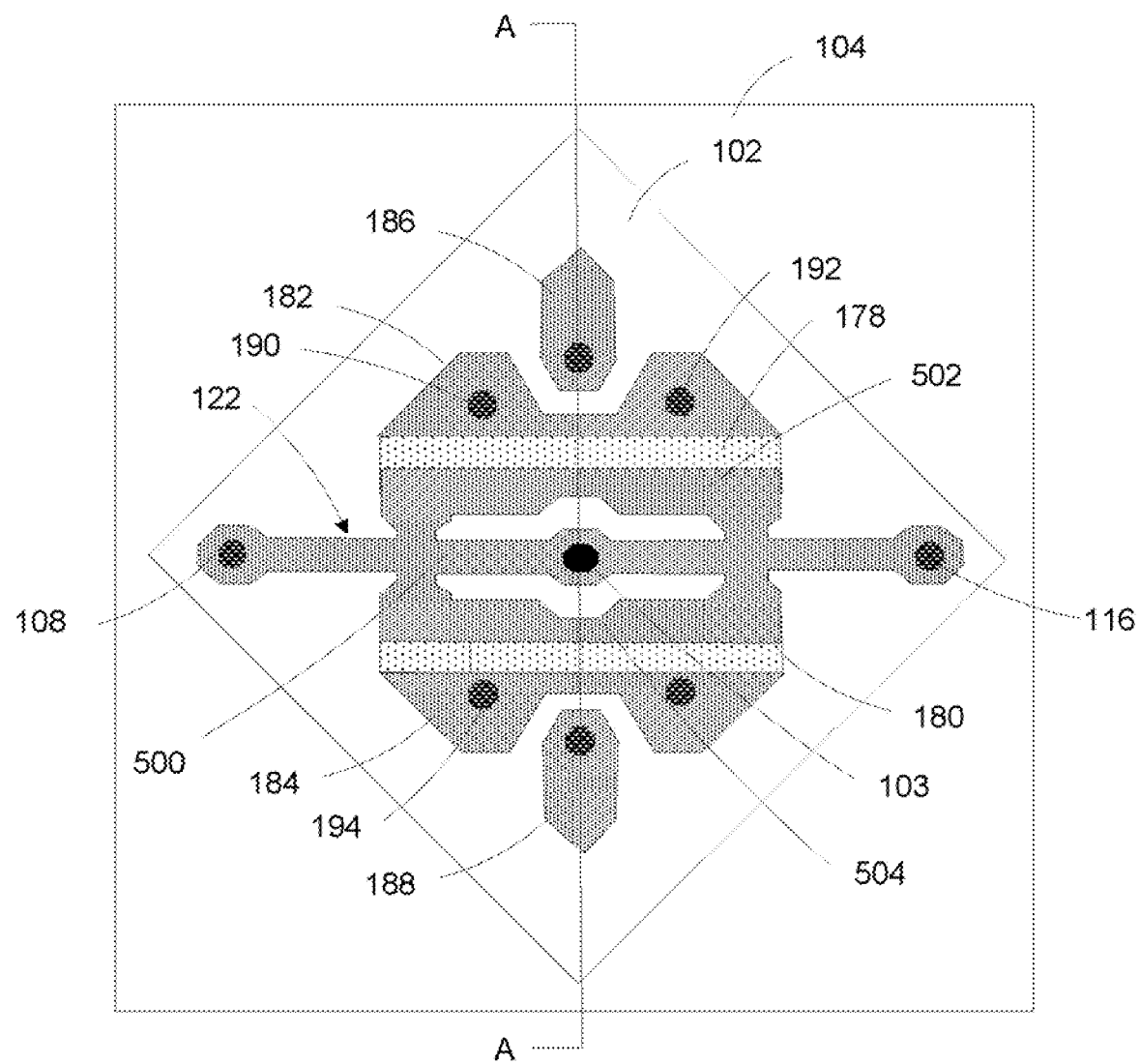
FIG. 10 illustrates a top view of a portion of an exemplary micromirror device having a stabilizer.

FIG. 10 schematically illustrates an exemplary micromirror device in which a deformable hinge with a stabilizer is provided. For simplicity purpose, some features, such as the mirror plate and electrode pads of the micromirror are not shown in the figure. Referring to FIG. 10, hinge combination 122 that comprises deformable hinge 500 and wings 502 and 504 of a stabilizer frame as discussed above with reference to FIG. 4 is held on substrate 104 by hinge posts 108 and 116. Raised addressing electrodes 182 and 184 are disposed substantially at the same plane as the deformable hinge that is at the natural resting state for electrostatically deflecting the mirror plate (102). The raised electrodes (182 and 184) are supported by electrode posts, such as posts 190 and 192. Electrode pads 178 and 180 are disposed on a separate plane underneath the deformable hinge and the raised electrodes (182 and 184) for electrostatically attracting the stabilizer wings (502 and 504) so as to rotate the mirror plate. The mirror plate (102), which is above the substrate (104) and the deformable hinge, is attached to the deformable hinge by mirror post 103.

In this example, a single stopper is provided for stopping the rotation of the mirror plate along a rotation direction at a specific rotation angle. Specifically, single stopper 186 is provided for stopping the rotation of the mirror plate along the first direction at the first angle; and single stopper 188 stops the rotation of the mirror plate along the second direction opposite to the first direction at the second angle. The first and second angles have the opposite signs ("+" and "−" signs). During the settling of the mirror plate at either stopper 186 or 188, the mirror plate may experience roll movement. Such roll movement is avoided or minimized by the stabilizer attached to the deformable hinge.

Figure 11A:
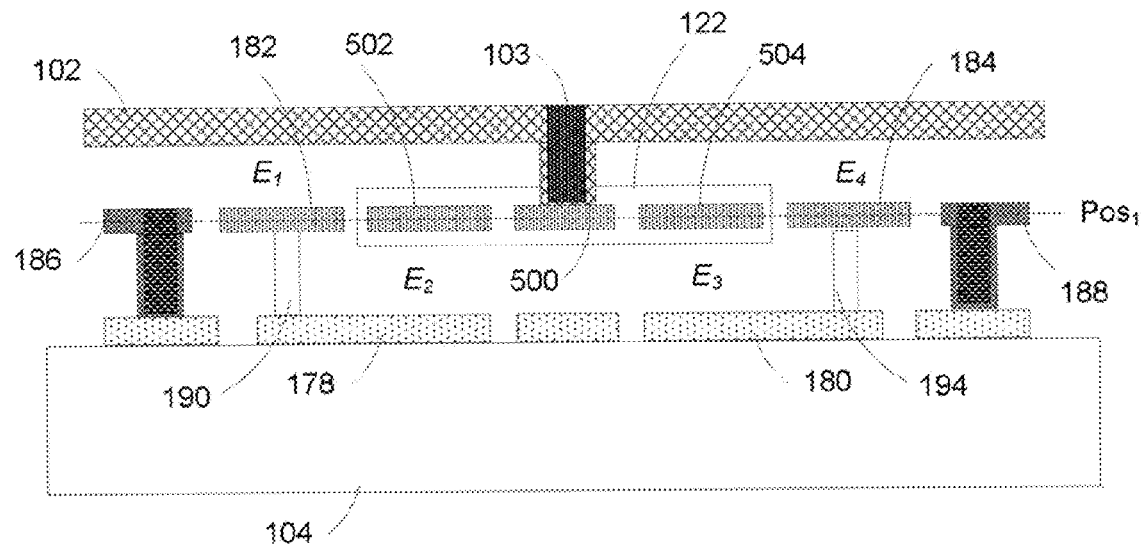
FIG. 11a illustrates a cross-sectional view of the micromirror device in FIG. 10 when the mirror plate is at a natural resting position.

For better illustrating the elements of the micromirror device in FIG. 10, a cross-sectional view taken along the line AA and in a plane perpendicular to substrate 104 is schematically illustrated in FIG. 11a with the mirror plate at a natural resting state (non-deflected state).

Referring to FIG. 11a, mirror plate 102 is attached to deformable hinge 500 through mirror post 103. Wings 502 and 504 of the stabilizer of hinge combination (122), which comprises deformable hinge 500 and the stabilizer, are in the same plane as the deformable hinge (500), and at the opposite sides of the deformable hinge (500). Elements 182 and 184 are raised electrodes and are located substantially at the same plane as the deformable hinge (500) and wings 502 and 504. Raised electrodes 182 and 184 (which are illustrated as dashed-blocks in the cross-sectional view) are connected to and supported by posts 190 and 194 that are formed on electrode pads 178 and 180 on substrate 104. The stabilizer wings 502 and 504, deformable hinge 500, as well as the attachments of the stabilizer wings to the deformable hinge as illustrated in the top view in FIG. 10, together form a hinge combination (122). $Pos_1$ illustrates a plane parallel to the mirror plate and the deformable hinge at the natural resting state (e.g. a non-deflected state).

Figure 15:
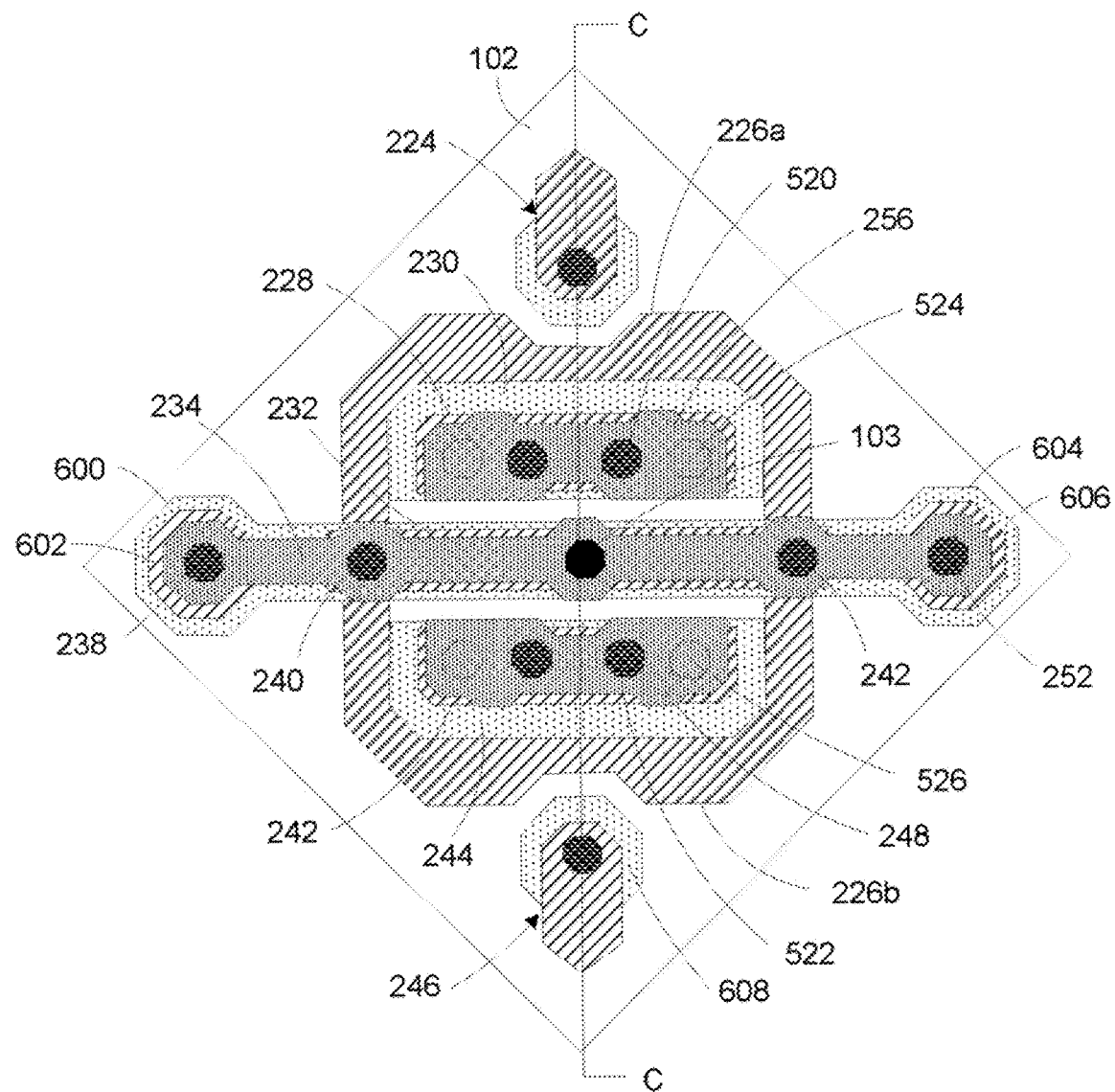
FIG. 15 illustrates a top view of a portion of yet another exemplary micromirror device having a stabilizer and one stopper at each side of the deformable hinge such that the rotation of the mirror plate along one direction is stopped by one stopper.

In this example, the hinge stabilizer has stabilizer wings 502 and 504 inside the raised addressing electrodes 182 and 184 relative to the rotation axis of the hinge (500). The hinge stabilizer with such a configuration is referred to as "inboard stabilizer." On the contrary, a stabilizer having stabilizer wings outside the raised addressing electrodes relative to the hinge rotation axis (e.g. as illustrated in FIG. 15) is referred to as an "outboard stabilizer." Elements 186 and 188 are stoppers that are formed on substrate 104. Electrode pads 178 and 180, as well as other components, such as electrical circuits, are formed on substrate 104.

With the above configuration, electrostatic fields $E_1$ and $E_4$ can be established between the mirror plate (102) and the raised electrodes 182 and 184 so as to rotate the mirror plate (102). Because the stabilizer wings (502 and 504) are exposed to the electrodes (178 and 180), electrical fields $E_2$ and $E_3$ can also be established between the stabilizer wings (502 and 504) and the associated electrodes (178 and 180). As such, the stabilizer wings can be moved by the associated electrodes, resulting in motion of the hinge stabilizer, which in turn, yields an electrostatic torque to the deformable hinge for moving the deformable hinge. For demonstration purpose, FIG. 11b schematically illustrates an instance wherein the mirror plate is at a deflected state.

Figure 11B:
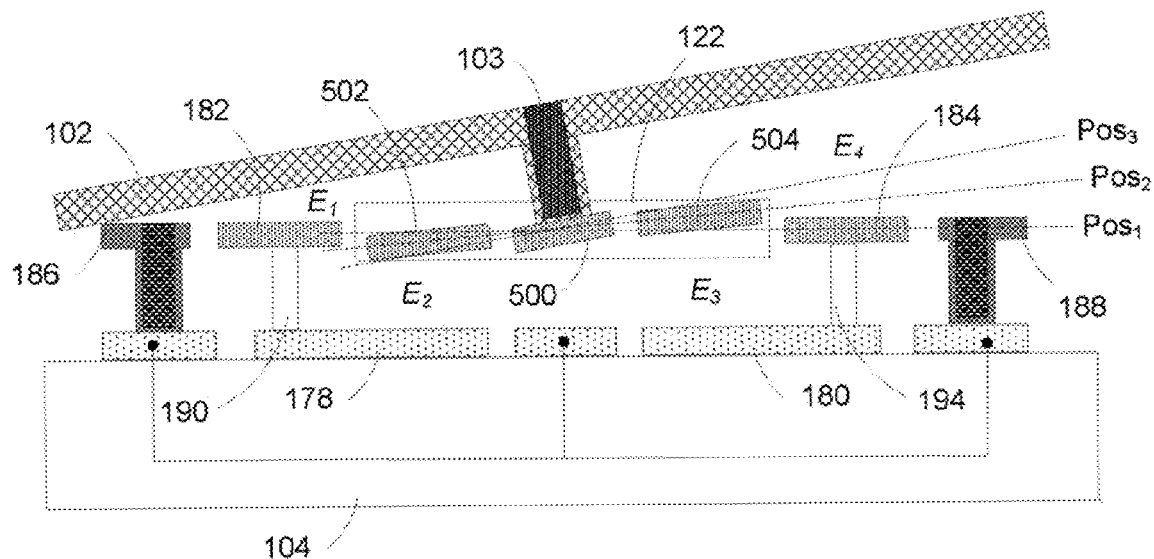
FIG. 11b illustrates a cross-sectional view of the micromirror device in FIG. 10 when the mirror plate is at a rotated position and the deformable hinge is deformed.

Referring to FIG. 11b, an electrostatic field $E_1$ is established between raised electrode 182 and mirror plate 102. The electrostatic field $E_1$ yields an electrostatic torque to the mirror plate (102), causing the mirror plate to rotate counter-clockwise as illustrated in FIG. 11b. At a desired rotation angle (e.g. the ON state angle), the mirror plate is abut against stopper 186 that stops the rotation of the mirror plate. To avoid electrical short between the mirror plate and the stopper (186 or 184), the stoppers are electrically connected to the mirror plate through, for example, the stopper post, the hinge support, the deformable hinge, the mirror post, and the mirror plate. As a result, the stoppers are at the same electrical potential as the mirror plate.

For improving the efficiency of rotating the mirror plate, another electrostatic field $E_2$ can be established between the stabilizer wing (502) and the associated electrode (178). Electrostatic field $E_2$ yields an electrostatic torque to the stabilizer wing (502) and causes the stabilizer wing (502) to move towards the associated electrode (178). The motion of the stabilizer wing (502) causes the movement of the stabilizer, which in turn, causes the deformation of the deformable hinge. The deformation of the deformable hinge enhances the desired movement of the mirror plate. In the following, a hinge stabilizer having at least a portion that is exposed to an electrical field for causing the desired rotation of the mirror plate, as the stabilizer having wings 502 and 504 discussed above, is referred to as an "active hinge stabilizer" or an "active stabilizer." On the contrary, a stabilizer having substantially no such portions is referred to as an "inactive hinge stabilizer" or an "inactive stabilizer."

Depending upon the specific design of the micromirror, especially the attachments of the stabilizer to the deformable hinge, the deformable hinge and the flexure portion(s) of the stabilizer may have any suitable amount of deformations. In one example wherein the stabilizer is attached to the deformable hinge with the attachment points being substantially at the mid-way points of the deformable hinge as discussed above with reference to FIG. 9a through FIG. 9d, the flexure portions of the stabilizer can be rotated by an angle that is substantially half the angle rotated by the mirror plate (or the deformable hinge). As schematically illustrated in FIG. 11b, $Pos_1$ is the plane parallel to the mirror plate and the deformable hinge at the natural resting state. $Pos_2$ is the plane of the deformed portions (e.g. wings 502 and 504) of the stabilizer of the hinge combination (122 in FIG. 11a); and $Pos_3$ is the plane of the deformed hinge at the deformed state. The angle between planes $Pos_1$ and $Pos_2$ is substantially half the angle between planes $Pos_1$ and $Pos_3$. Of course, planes $Pos_1$, $Pos_2$, and $Pos_3$ may have any other desired angular relations.

Figure 12:
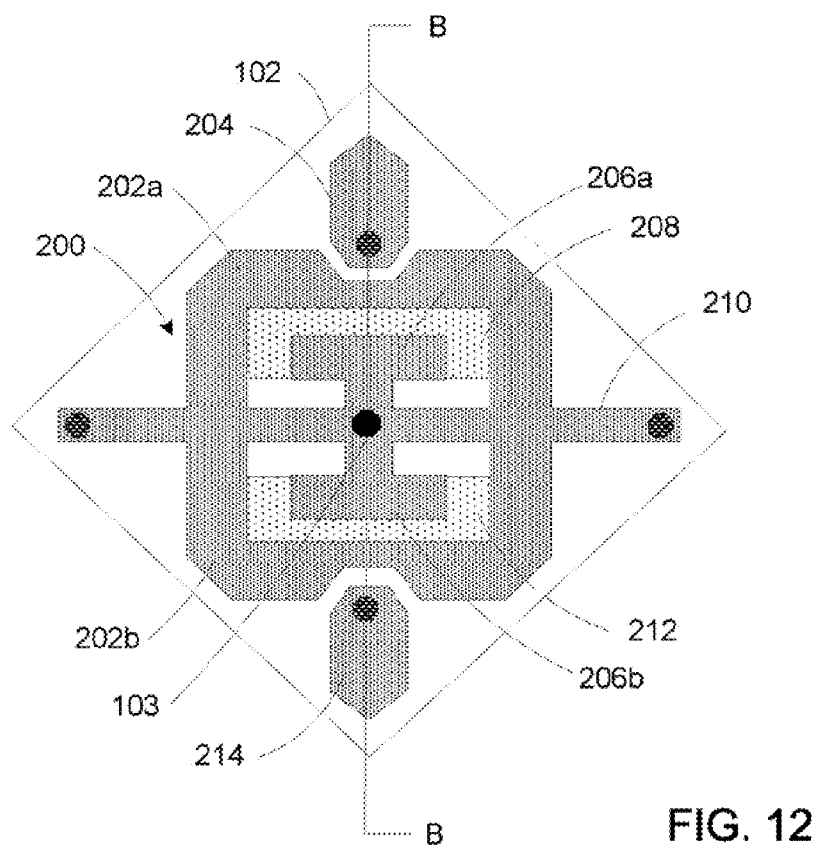
FIG. 12 illustrates a top view of a portion of another exemplary micromirror device having a stabilizer.

FIG. 12 schematically illustrates another exemplary micromirror device in which a hinge stabilizer mechanism is implemented. For simplicity purpose, the substrate of the micromirror device is removed. Referring to FIG. 12, hinge combination 200 comprises deformable hinge 210, a stabilizer frame, and a hinge extension arm. The stabilizer frame comprises stabilizer wings 202a and 202b attached to the deformable hinge (210). The hinge extension arm comprises wings 206a and 206b attached to the deformable hinge at point 103 at which the mirror plate post is attached to the deformable hinge.

Deformable hinge 210 can be the same as deformable hinge 100 ad discussed above with reference to FIG. 3a through FIG. 8. The stabilizer frame (comprising wings 202a and 202b) can be the same as stabilizer frame 126 as discussed above with reference to FIG. 4. Hinge extension arms 206a and 206b form an "H" shape, and are formed in the same plane as the deformable hinge when the deformable hinge is at the natural resting state. Electrode pads 208 and 212 are disposed at a separate plane as the deformable hinge (210); and are disposed for electrostatically deflecting the mirror plate that is attached to the deformable hinge using mirror plate post 103. In particular, electrode pad 208 can be employed to electrically attract extension arm 206a; and electrode pad 212 can be employed to electrically attract extension arm 206b.

In the example illustrated in FIG. 12, single stopper design is employed. Specifically, a single stopper (e.g. stoppers 204 and 214 on either side of the rotation axis and below the plane of the mirror plate) is deployed for stopping the rotation of the mirror plate at each desired rotational state. The micromirror device may have other desired features. For example, the major corners of the hinge stabilizer frame (202) can be clipped off so as to form recessed corners. This feature can be important in avoiding unwanted contact of the mirror plate to the corners of the hinge stabilizer frame.

Figure 13A:
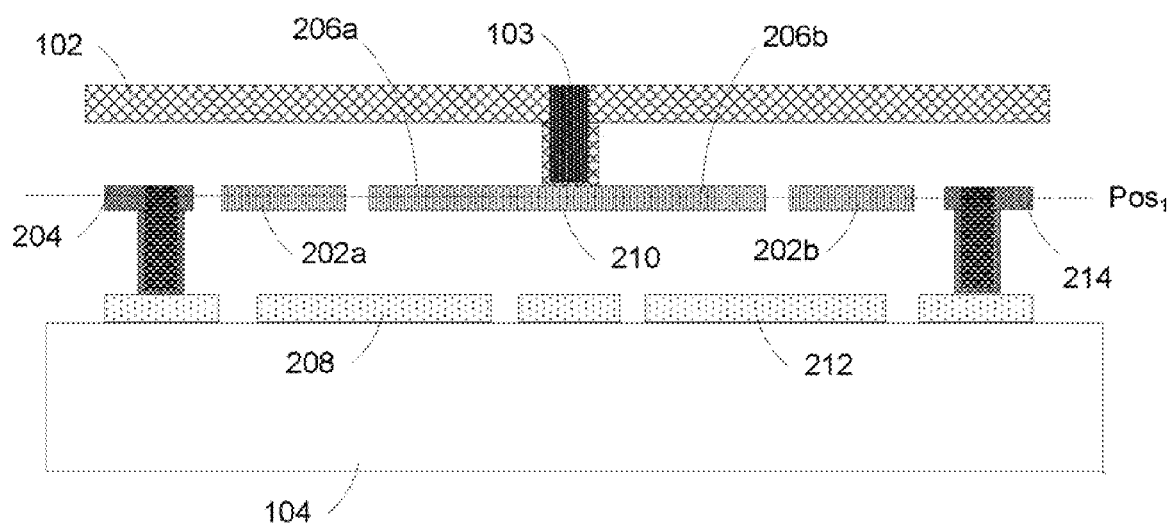
FIG. 13a illustrates a cross-sectional view of the micromirror device in FIG. 12 when the mirror plate is at a natural resting position.

A cross-section of the micromirror device in FIG. 12 taken along line BB and in a plane perpendicular to the substrate on which the micromirror is formed is schematically illustrated in FIG. 13a with the micromirror device is at a natural resting state. Referring to FIG. 13a, mirror plate 102 is attached to the deformable hinge (210) through mirror post 103. Extension arms 206a and 206b, stabilizer wings 202a and 202b, and stoppers 204 and 214 are disposed in the same plane as the deformable hinge. Electrode pads 208 and 212 are formed on substrate 104 for electrostatically deforming the mirror plate (102). $Pos_1$ is the plane parallel to the mirror plate and the deformable hinge at the natural resting state. For demonstration purpose, FIG. 13b schematically illustrates the micromirror device in FIG. 13a at a deflected state.

Figure 13B:
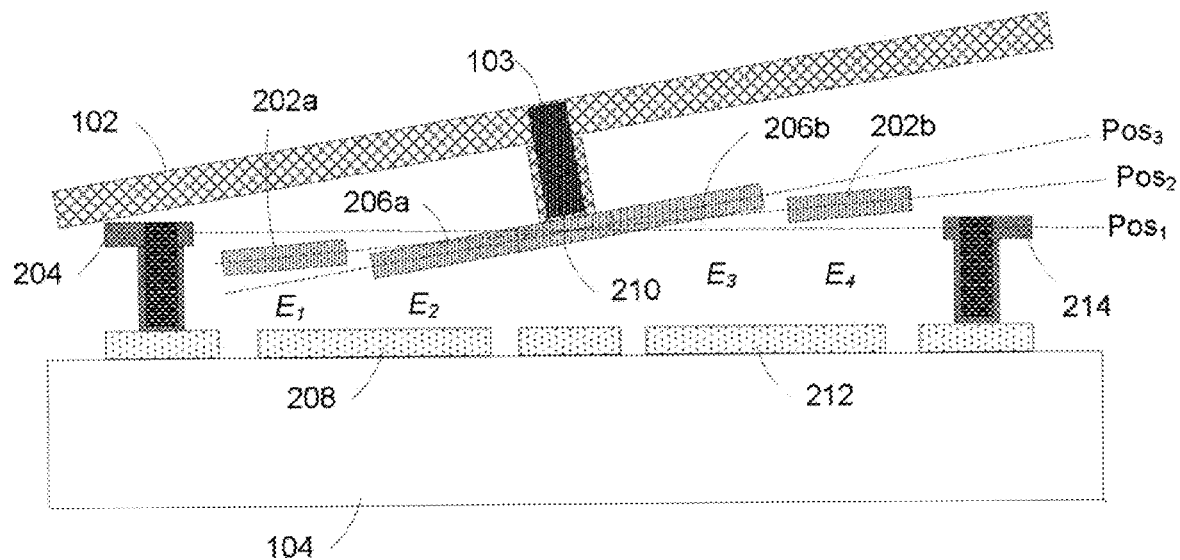
FIG. 13b illustrates a cross-sectional view of the micromirror device in FIG. 12 when the mirror plate is at a rotated position and the deformable hinge is deformed.

Referring to FIG. 13b, at the deflected state, mirror plate 102 contacts with stopper 204 and is maintained at the desired rotational angle. The electrostatic field $E_1$ between wing 202a and associated electrode pad 208 creates an electrostatic torque that acts to rotate the stabilizer counterclockwise about the hinge rotation axis. As the stabilizer rotates, torque is transferred through the hinge 210 to the mirror post 103, and then to the mirror (102) causing it to rotate counterclockwise. Additionally, the electrostatic field $E_2$ between electrode pad 208 and extension arm 206a creates an electrostatic torque that acts to rotate the hinge extension arm 206a counterclockwise, causing the mirror to rotate counterclockwise. Together, electrostatic fields $E_1$ and $E_2$ act to rotate the mirror counterclockwise. At the deflected state, the flexure portions (wings 202a and 202b) of the stabilizer can deform substantially half the angle of the deformable hinge. As schematically illustrated in FIG. 13b, $Pos_1$ is the plane parallel to the mirror plate and the deformable hinge at the natural resting state. $Pos_2$ is the plane of the deformed portions (e.g. wings 202a and 202b) of the stabilizer; and $Pos_3$ is the plane of the deformed hinge (also the extension arms 206a and 206b) at the deformed state. The angle between planes $Pos_1$ and $Pos_2$ is substantially half the angle between planes $Pos_1$ and $Pos_3$. Of course, planes $Pos_1$, $Pos_2$, and $Pos_3$ may have any other desired angular relations.

Figure 14:
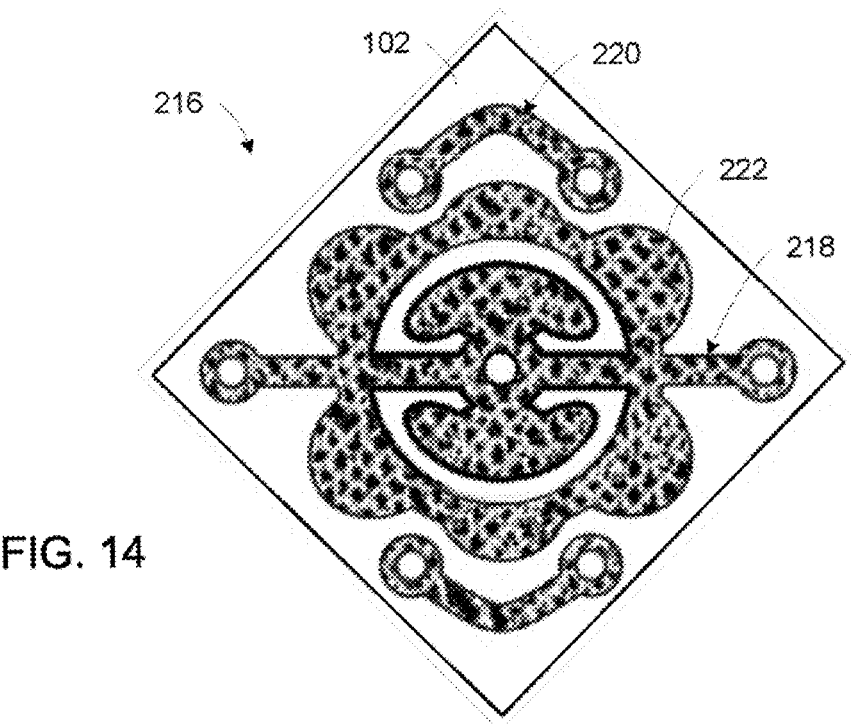
FIG. 14 illustrates a top view of a portion of yet another exemplary micromirror device having a stabilizer.

Other than the examples as discussed above with reference to FIG. 10 through FIG. 13b, the hinge stabilizing mechanism of this disclosure can be implemented in many other ways, one of which is schematically illustrated in FIG. 14.

Referring to FIG. 14, a top view of a portion of micromirror device 216 is schematically illustrated therein. Mirror plate 102 is attached to a deformable hinge structure (218) with a hinge stabilizer (222) formed in the same plane as the deformable hinge. Single stopper, such as stopper 220, is provided for stopping the rotation of the mirror plate at each rotational state.

Other than implementing a hinge stabilizer mechanism at the same plane of the deformable hinge as discussed above, a hinge stabilizing mechanism can be implemented in a micromirror device by forming the hinge stabilizer at separate planes underneath the deformable hinges. FIG. 15 schematically illustrates such an exemplary micromirror device. For simplicity, the substrate is removed; and the mirror plate is illustrate as transparent so as to show the underneath components of the micromirror.

Referring to FIG. 15, deformable hinge 234, which can be the same as the deformable hinge 100 as discussed above with reference to FIG. 3a, is formed and held above the substrate of the micromirror device by hinge posts 238 and 252. A stabilizer frame comprising stabilizer wings 226a and 226b is formed at a separate plane underneath the deformable hinge (e.g. between the deformable hinge and the substrate); and is attached to the deformable hinge by posts 240 and 242 such that the geometric center or the mass center of the stabilizer frame is substantially aligned to the geometric center or the mass center of the deformable hinge, or is aligned to the mirror post 103 that attaches the mirror plate (102) to the deformable hinge (234). A stabilizer having stabilizer wings outside the raised addressing electrodes relative to the hinge rotation axis is referred to as an "outboard stabilizer." Inline roll-stabilizer 232, which can be the same as the stabilizer 106 as discussed above with reference to FIG. 3a, is at a separate plane underneath the deformable hinge and attached to the deformable hinge by posts 240 and 250.

Elements 228 and 242 mechanically support the raised electrodes 248 and 256, and provide an electrical conduction path between the raised electrodes 248 and 256, and the underlying electrode pads 230 and 244

Raised addressing electrodes 248 and 256 are substantially at the same plane as the deformable hinge when the deformable hinge is at the natural resting state. Electrode pads 230 and 244 are formed on the substrate of the micromirror device for electrostatically deflecting the mirror plate. A single stopper design can be implemented in this micromirror device. Specifically, single stoppers 224 and 246 can be provided at the opposite sides of the deformable hinge for stopping the mirror plate at the desired rotational angles.

Figure 16A:
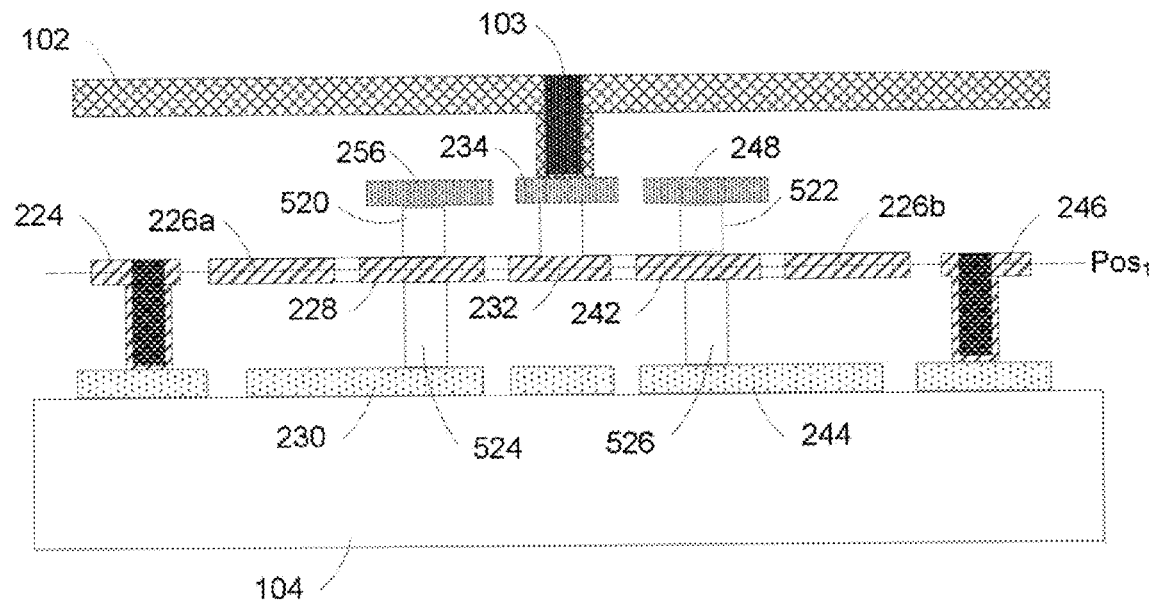
FIG. 16a is a cross-sectional view of a portion of the micromirror device in FIG. 15 when the mirror plate is at a natural resting state.

A cross-sectional view taken along line CC and in a plane perpendicular to the substrate of the micromirror when the deformable hinge is at the natural resting state is schematically illustrated in FIG. 16a. Referring to FIG. 16a, electrode pads 230 and 244 are formed on substrate 104 that can be a semiconductor substrate, such as a silicon substrate or silicon wafer. Stoppers 224 and 246 are held above the substrate by stopper posts. In substantially the same plane of stoppers 224 and 246, stabilizer wings 226a and 226b, raised electrode supports 228 and 242, and inline roll-stabilizer 232 are deployed. Raised electrode supports 228 and 242 are respectively supported by posts 524 and 526 above substrate 104. Because posts 524 and 526 are not along line CC along which the cross-sectional view is taken, they are illustrated as dashed-blocks. Mirror plate 102 is attached to the deformable hinge 234 by mirror post 103. $Pos_1$ is the plane parallel to the mirror plate and the deformable hinge at the natural resting state. A cross-sectional view of the micromirror device taken along line CC and in a plane perpendicular to the substrate of the micromirror device when the deformable hinge is at a deflected state is schematically illustrated in FIG. 16b.

Figure 16B:
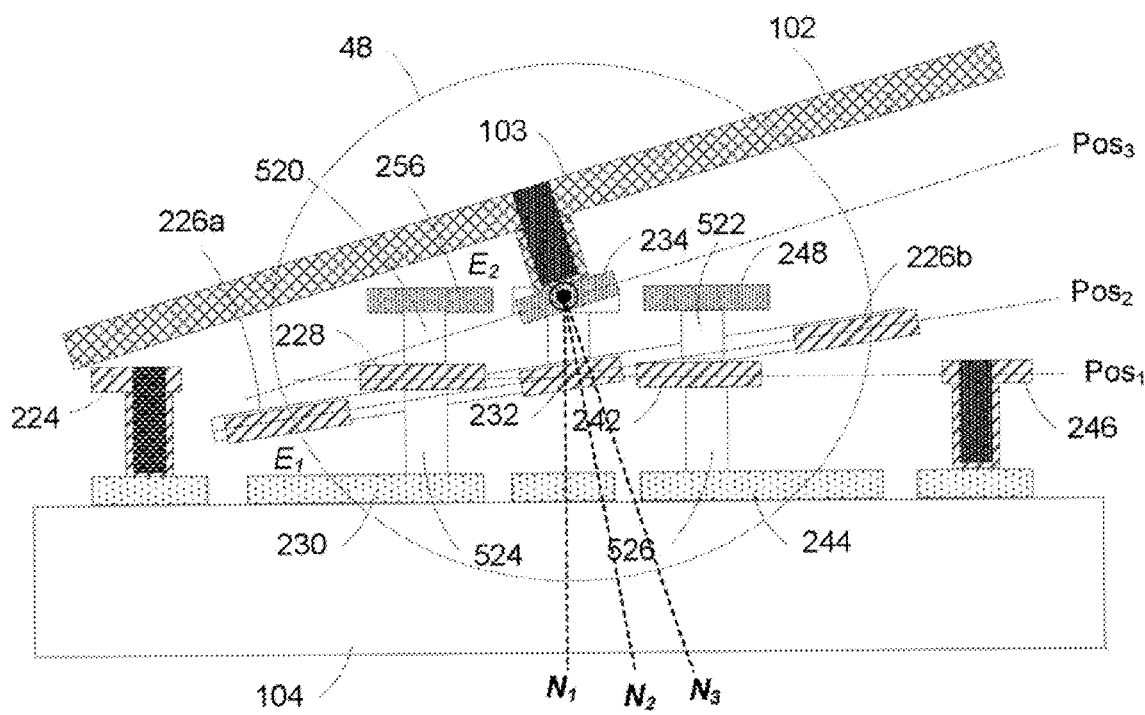
FIG. 16b is a cross-sectional view of a portion of the micromirror device in FIG. 15 when the mirror plate is at a rotational position.

Referring to FIG. 16b, an electrostatic field $E_1$ is established between electrode pad 230 and stabilizer wing 226a such that the stabilizer wing 226a is attracted towards electrode pad 230. Another electrostatic field $E_2$ is established between raised electrode 256 and mirror plate 102, under the field of which, the mirror plate rotates towards raised electrode 256. It can be seen that stabilizer wings 226a and 226b are the electrically active extension of the outboard roll-stabilizer. In the example wherein the stabilizer is attached to the deformable hinge at mid-way points as discussed above with reference to FIG. 9a through FIG. 9d, the stabilizer frame and its wings 226a and 226b and inline stabilizer 232 may have an angle that is substantially half of the angle of the deformable hinge. As schematically illustrated in FIG. 16b, $Pos_1$ is the plane parallel to the mirror plate and the deformable hinge at the natural resting state. $Pos_2$ is the plane of the stabilizer frame and its wings 226a and 226b and inline stabilizer 232 at the deformed state; and $Pos_3$ is the plane of the deformed hinge at the deformed state. The angle between planes $Pos_1$ and $Pos_2$ is substantially half the angle between planes $Pos_1$ and $Pos_3$. Of course, planes $Pos_1$, $Pos_2$, and $Pos_3$ may have any other desired angular relations. It is noted that the stabilizer frame and its wings 226a and 226b, as well as the inline stabilizer 232 deforms relative to the rotation axis of the deformable hinge 234, which is better illustrated in a magnified view of portion 48, which is schematically illustrated in FIG. 16c.

Figure 16C:
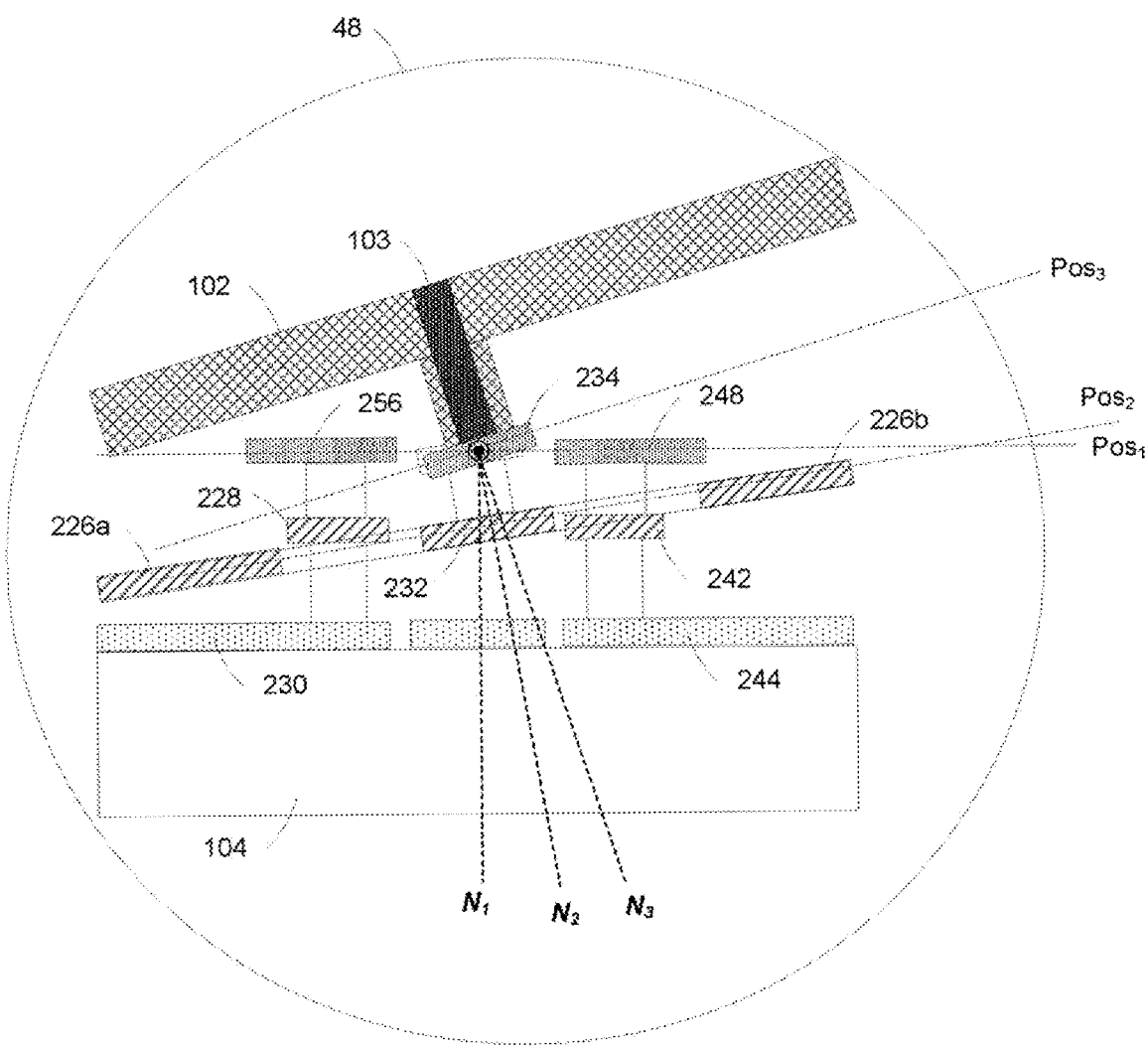
FIG. 16c is an exploded view of a portion of the cross-sectional view in FIG. 16b showing the angular relations of the deformable hinge and the hinge stabilizer of the micromirror device.

Referring to FIG. 16c, $N_1$, $N_2$, and $N_3$ are normal directions of planes $Pos_1$, $Pos_2$, and $Pos_3$, respectively; and the three normal directions substantially converge at the rotation axis (represented by the solid-circle at deformable hinge 234) of the deformable hinge.

Figure 17:
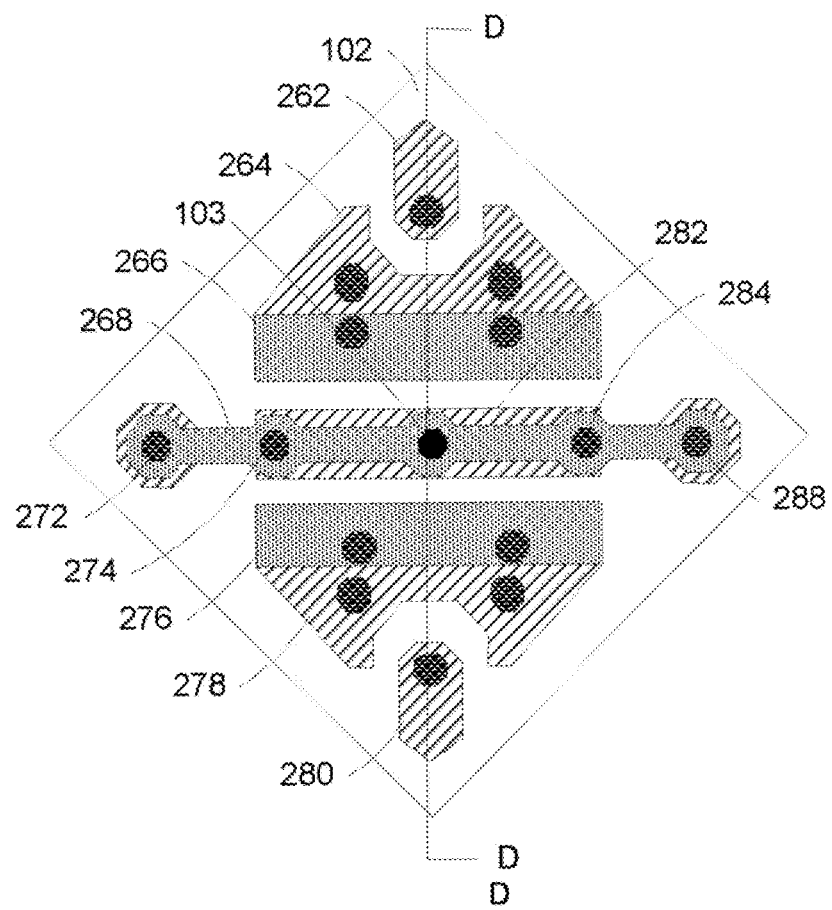
FIG. 17 illustrates a top view of a portion of yet another exemplary micromirror device having a stabilizer and one stopper at each side of the deformable hinge such that the rotation of the mirror plate along one direction is stopped by one stopper.

Another exemplary micromirror device implemented therein a hinge stabilizing mechanism is schematically illustrated in FIG. 17. Referring to FIG. 17, inline stabilizer 282 is in a separate plane underneath deformable hinge 268, and is attached to the deformable hinge by posts 274 and 284. The inline stabilizer can be the same as stabilizer 106 as discussed above with reference to FIG. 3a. The deformable hinge, as well as the inline stabilizer, is held above the substrate (not shown in the figure for simplicity) of the micromirror device by hinge posts 272 and 288. Raised electrodes 266 and 276 are disposed on the opposite sides of the deformable hinge and are substantially in the same plane of the deformable hinge when the deformable hinge is at the natural resting state. Electrodes 264 and 278 are at a lower plane than raised electrodes 266 and 276. In one example, electrodes 264 and 278 can be in the plane of the inline stabilizer (282). Single stoppers 262 and 280 are disposed at opposite sides of the deformable hinge for stopping the mirror plate at desired rotational angles. Mirror plate 102 is attached to the deformable hinge by mirror post 103.

Figure 18:
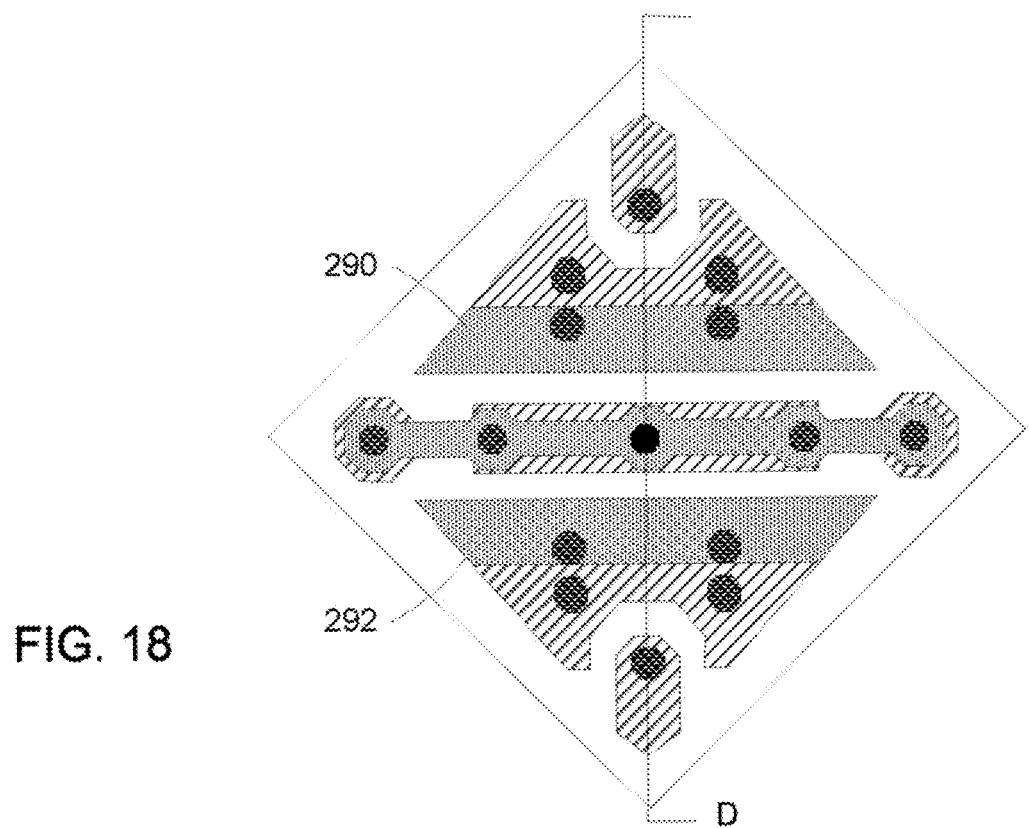
FIG. 18 illustrates a top view of a portion of yet another exemplary micromirror device having a stabilizer and one stopper at each side of the deformable hinge such that the rotation of the mirror plate along one direction is stopped by one stopper.

In the example shown in FIG. 17, raised electrodes 266 and 276 each have a substantially rectangular shape with the length substantially equal to the length of electrodes 264 and 278. To optimize the electrostatic fields between the mirror plate and raised electrodes 266 and 276, the area of either or both raised electrodes 266 and 276 can be maximized as appropriate, an example of which is schematically illustrated in FIG. 18. Referring to FIG. 18, raised electrodes 290 and 292 each have a larger electrostatic area than that of raised electrodes 266 and 276 in FIG. 17.

Figure 19A:
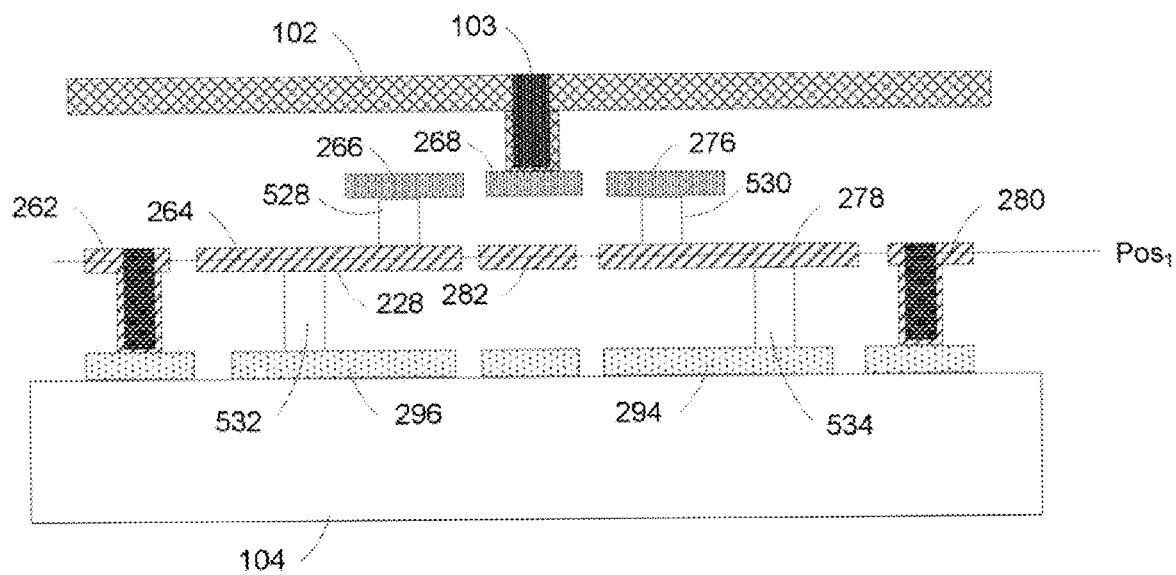
FIG. 19a is a cross-sectional view of a portion of the micromirror device in FIG. 17 (and FIG. 18) when the mirror plate is at a natural resting state.

A cross-sectional view of the micromirror devices illustrated in FIG. 17 and FIG. 18 taken along line DD and in a plane perpendicular to the substrate on which the micromirror is formed is schematically illustrated in FIG. 19a with the micromirror at the natural resting state.

Referring to FIG. 19a, electrode pads 296 and 294 are formed on substrate 104. Elevated electrodes 264 and 278 are held above the substrate by posts 532 and 534. Because posts 532 and 534 are not along line DD along which the cross-sectional view is taken, they are illustrated as dashed-blocks. Substantially in the same plane of the elevated electrodes 264 and 278, stoppers 262 and 280 are disposed with each being supported by a post on substrate 104. Inline stabilizer 282 is disposed at the plane underneath the deformable hinge (268) and attached to the deformable hinge by posts (not shown).

Raised electrodes 266 and 276 are held above the elevated electrodes 264 and 278 by posts 528 and 530 as shown in the figure. Because posts 528 and 530 are not along line DD along which the cross-sectional view is taken, they are illustrated as dashed-blocks. Mirror plate 102 is attached to the deformable hinge (268) by mirror post 103. $Pos_1$ is the plane parallel to the mirror plate and the deformable hinge at the natural resting state.

Figure 19B:
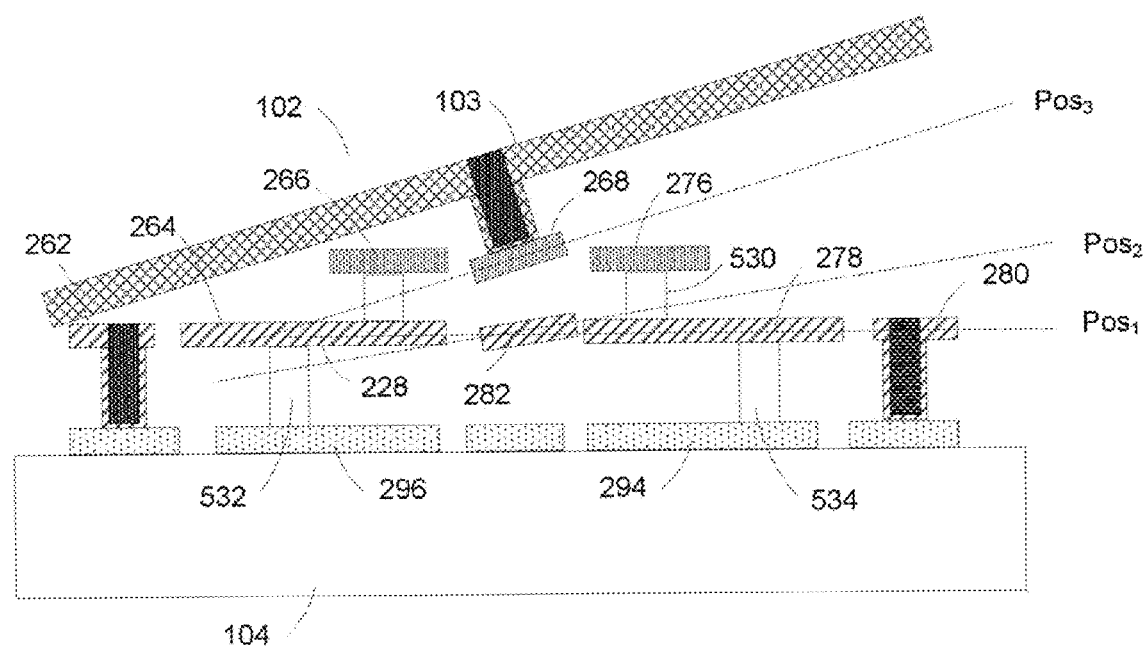
FIG. 19b is a cross-sectional view of a portion of the micromirror device in FIG. 17 (and FIG. 18) when the mirror plate is at a rotational position.

A cross-sectional view of the micromirror device in FIG. 19a with the mirror plate at a rotated state is schematically illustrated in FIG. 19b. Referring to FIG. 19b, the mirror plate (102) is contacted against stopper 262. Deformable hinge 268, as well as the inline stabilizer attached to the deformable hinge, deforms due to the rotation of the mirror plate. In the example wherein the stabilizer is attached to the deformable hinge at mid-way points as discussed above with reference to FIG. 9a through FIG. 9d, inline stabilizer 282 may have an angle that is substantially half of the angle of the deformable hinge. As schematically illustrated in FIG. 19b, $Pos_1$ is the plane parallel to the mirror plate and the deformable hinge at the natural resting state. $Pos_2$ is the plane of inline stabilizer 232 at the deformed state; and $Pos_3$ is the plane of the deformed hinge at the deformed state. The angle between planes Pos1 and $Pos_2$ is substantially half the angle between planes $Pos_1$ and $Pos_3$. Of course, planes $Pos_1$, $Pos_2$, and $Pos_3$ may have any other desired angular relations.

Figure 20:
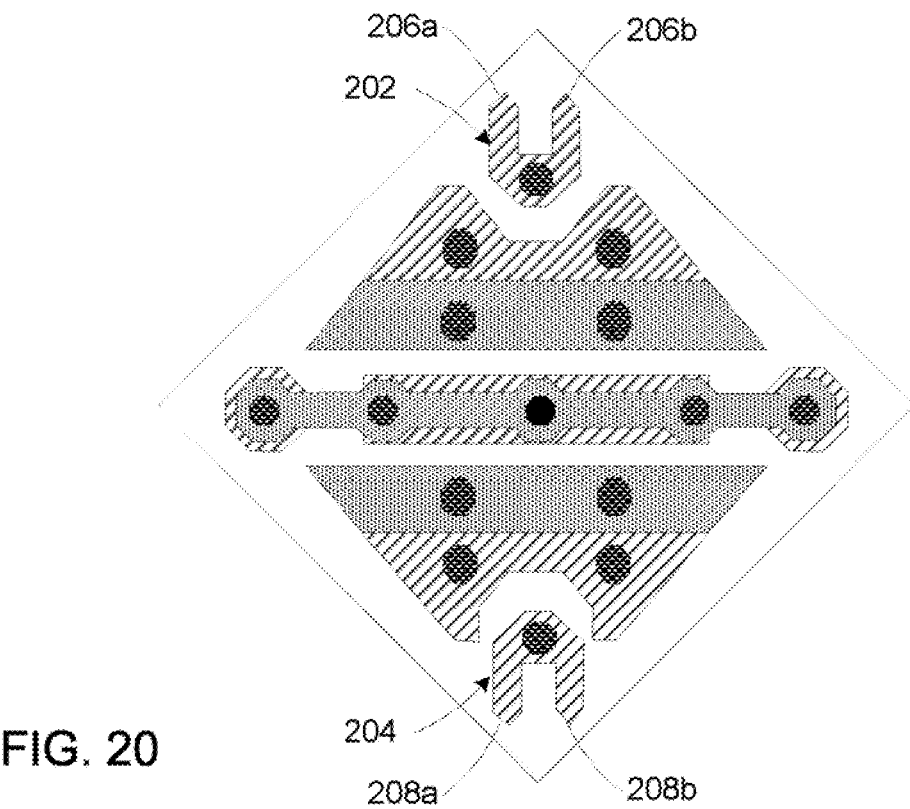
FIG. 20 illustrates a top view of a portion of yet another exemplary micromirror device having a stabilizer and multiple stoppers at each side of the deformable hinge such that the rotation of the mirror plate along one direction is stopped by multiple stoppers.

In addition to the single stopper design in the above examples, a stabilizing mechanism of this disclosure is also applicable to micromirror devices with multiple stoppers for each rotational position, an example of which is schematically illustrated in FIG. 20

Referring to FIG. 20, stoppers 202 and 204 each have multiple spring tips for stopping the mirror plate at the desired rotational positions. Specifically, stopper 202 comprises spring tips 206a and 206b pointing outward from the deformable hinge; and stopper 204 comprises spring tips 208a and 208b pointing outward from the deformable hinge. As compared to the multi-stopper design illustrated in FIG. 2, the stoppers (202 and 204) in FIG. 20 each have a much smaller area. As a result, the area taken from the electrostatic fields by the stoppers is reduced; while still keeping the advantages of multi-stopper designs. Such single-stop with multi-tip design can be implemented in any micromirror device as discussed above.

Figure 21:
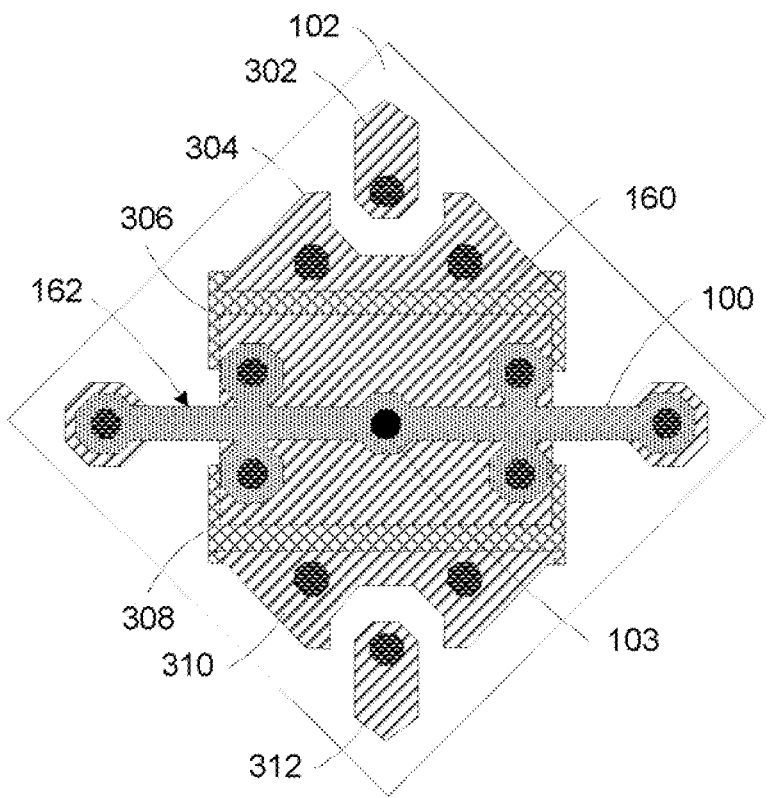
FIG. 21 illustrates a top view of a portion of yet another exemplary micromirror device having a stabilizer and one stopper at each side of the deformable hinge such that the rotation of the mirror plate along one direction is stopped by one stopper.

FIG. 21 schematically illustrates an exemplary micromirror device implemented therein a deformable hinge with an inline stabilizer as discussed above with reference to FIG. 8. Referring to FIG. 21, deformable hinge 100 and inline stabilizer with electrically active extension 160 that is attached to the deformable hinge form a hinge structure (162) as discussed above with reference to FIG. 8. Raised electrodes 304 and 310 for electrostatically deflecting the mirror plate (102) are in a separate plane underneath the deformable hinge, for example, in the same plane of the inline stabilizer 160. Stoppers 302 and 312 are disposed at the opposite sides of the deformable hinge for stopping the mirror plate at the desired rotational angles. Electrode pads 306 and 308 are disposed at the opposite sides of the deformable hinge and in a plane underneath the inline stabilizer with electrically active extension for electrostatically deflecting the active extension. In other examples, the stoppers each can be replaced by the stopper with multiple tips (202 or 204) as discussed above with reference to FIG. 20.

Figure 22:
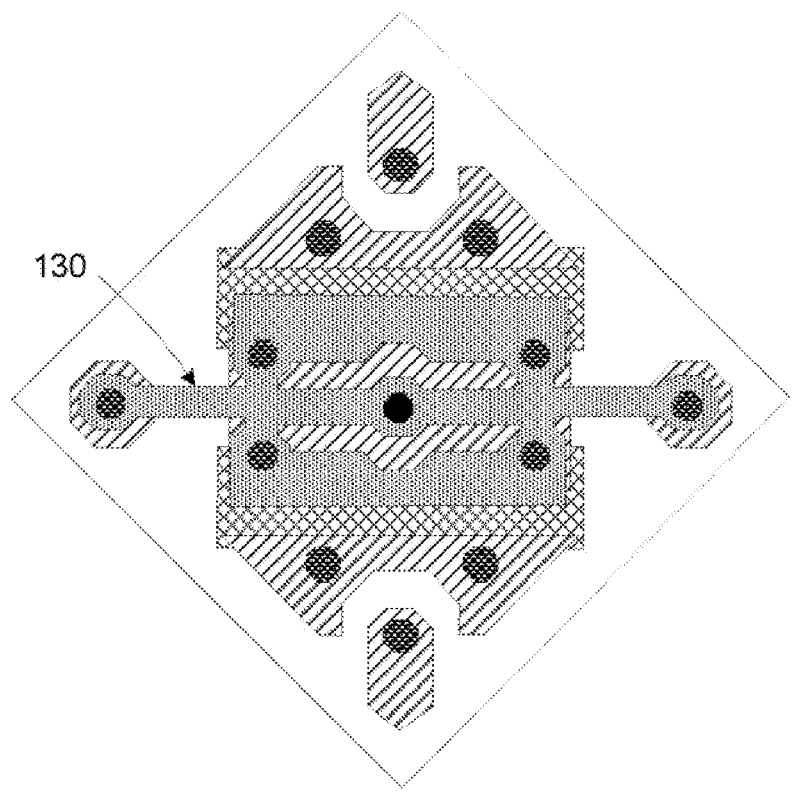
FIG. 22 illustrates a top view of a portion of yet another exemplary micromirror device having a stabilizer and one stopper at each side of the deformable hinge such that the rotation of the mirror plate along one direction is stopped by one stopper.

Other than using the deformable hinge and the inline stabilizer as illustrated in FIG. 8, the micromirror device in FIG. 21 can use the deformable hinge with a stabilizer frame as discussed above with reference to FIG. 5, as illustrated in FIG. 22. In the example shown in FIG. 22, combination 130 of a deformable hinge with a stabilizer frame attached thereto as discussed above with reference to FIG. 5 is employed. Other features may be the same as those for the micromirror device illustrated in FIG. 21, which will not be repeated herein.

A hinge stabilizer, as well as selected examples and exemplary implementations, has been discussed above. It is noted that the above discussion is for demonstration purposes, and should not be interpreted as a limitation. Other variations within the scope of the disclosure are also applicable. For examples of micromirror devices with deformable hinges (e.g. torsion hinges), hinge stabilizers can be implemented as inline or offline stabilizers, inboard or outboard stabilizers, electrically active or inactive stabilizers, or any combinations thereof. The hinge stabilizers can be in the same or different planes as the deformable hinges; and can be in planes above or below the deformable hinge planes. In relation to the raised electrodes, the hinge stabilizers can be in planes above or below the planes of the raised electrodes. Regardless of different configurations, it is preferred, even though not required that the stabilizer(s) is not directly contacted to the mirror plate. Specifically, there is substantially no contacting surface or interface between the hinge stabilizer(s) and the mirror plate at the natural resting state and/or at a deflected/deformed state.

As discussed above, multiple hinge stabilizers can be employed jointly in a single device for stabilizing the deformable hinge of the device. The multiple hinge stabilizers each can be an inline stabilizer, an offline stabilizer, an electrically active stabilizer, an electrically inactive stabilizer, an inboard stabilizer, or an outboard stabilizer. In relation to the plane of the deformable hinge at a natural resting state, the multiple hinge stabilizers (when used jointly in a single device) can be in the same plane as the deformable hinge plane, or can be above or below the deformable hinge plane. In relation to the plane(s) of the raised electrodes, the multiple hinge stabilizers can be in the same plane as the raised electrodes plane(s), or can be above or below the deformable hinge plane(s).

The micromirror device with a deformable hinge and a hinge stabilizer has many applications, one of which is spatial light modulator for use in imaging system, such as rear-projection systems and front-projection systems. An exemplary spatial light modulator is schematically illustrated in FIG. 23.

Figure 23:
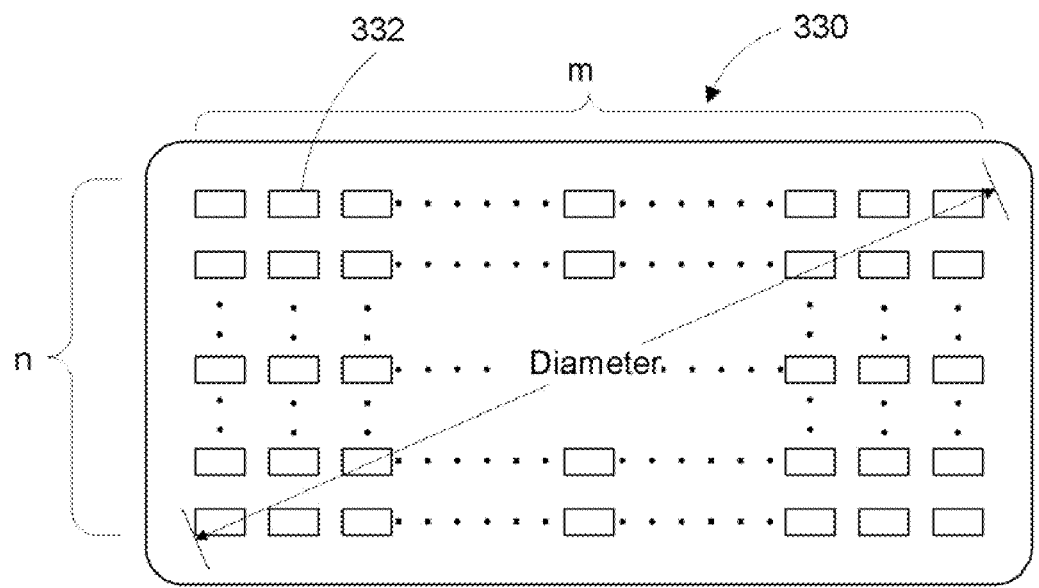
FIG. 23 schematically illustrates a spatial light modulator having an array of micromirrors, each of which comprises a deformable hinge and a hinge stabilizer.

Referring to FIG. 23, each rectangle (e.g. 332) represents a micromirror device; and the spatial light modulator (330) comprises n×m micromirror devices (referred to as resolution) with n being the number of rows and m being the number of columns. As an example, the spatial light modulator may have a resolution of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher, or integer multiples and fractions of these resolutions. Of course, other resolutions are also applicable. Each micromirror device can have a characteristic dimension of 100 microns or less, such as 20 microns or less, and 10 microns or less. The smallest distance between the adjacent micromirror devices is referred to as gap, which can be 5 microns or less, 2 microns or less, and 1 micron or less.

Figure 24:
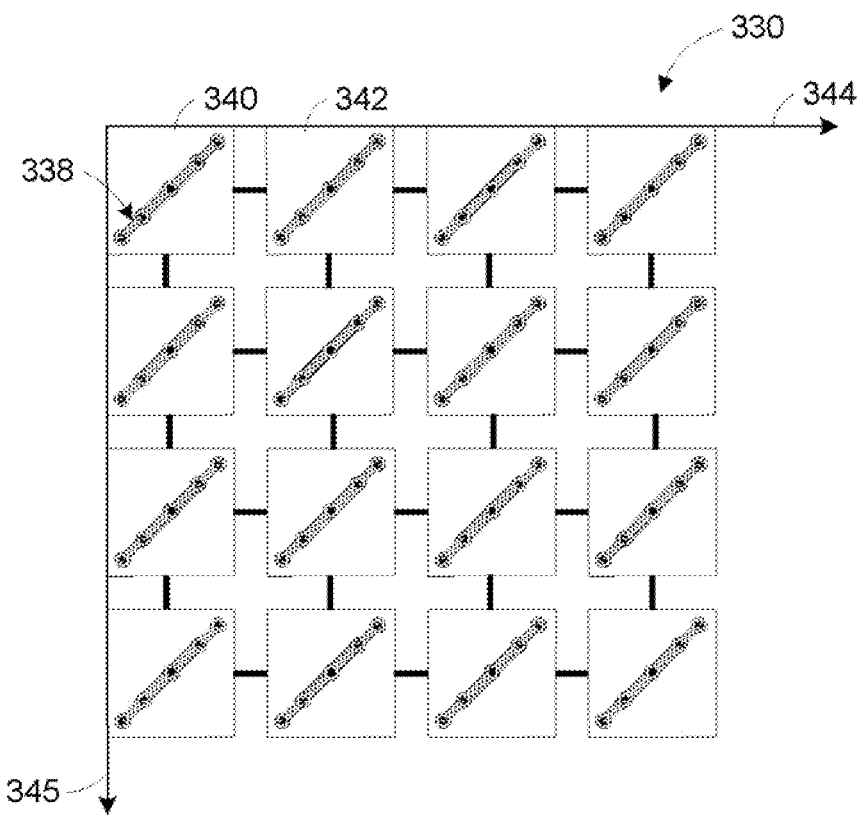
FIG. 24 schematically illustrates an exemplary arrangement of the micromirrors in the spatial light modulator of FIG. 23.

The micromirror devices can be arranged in the micromirror device array of the spatial light modulator in many ways, one of which is schematically illustrated in FIG. 24.

Referring to FIG. 24, each micromirror device takes a substantially square shape (or can be a rectangular shape); and the micromirror devices in the array are interconnected. The edges of the micromirror array are referred to straight lines with each having a length equal to or longer than the largest dimension of a micromirror device in the array, while other configurations are also applicable. The straight lines together form a closed region with the least area in which all micromirror devices are enclosed. For example, lines 344 and 345 are two major edges of the micromirror array. Each micromirror device can be disposed in the array such that the major edges of the micromirror device are parallel to the major edges of the micromirror array. The deformable hinge in each micromirror device, however, forms an angle, such as from 0° to 90° degrees relative to the edges of the micromirror array. The activation and reading/writing lines (e.g. wordlines and bitlines) for activating and setting the operation status of the individual micromirror devices can also be parallel to the edges of the micromirror array.

Figure 25:
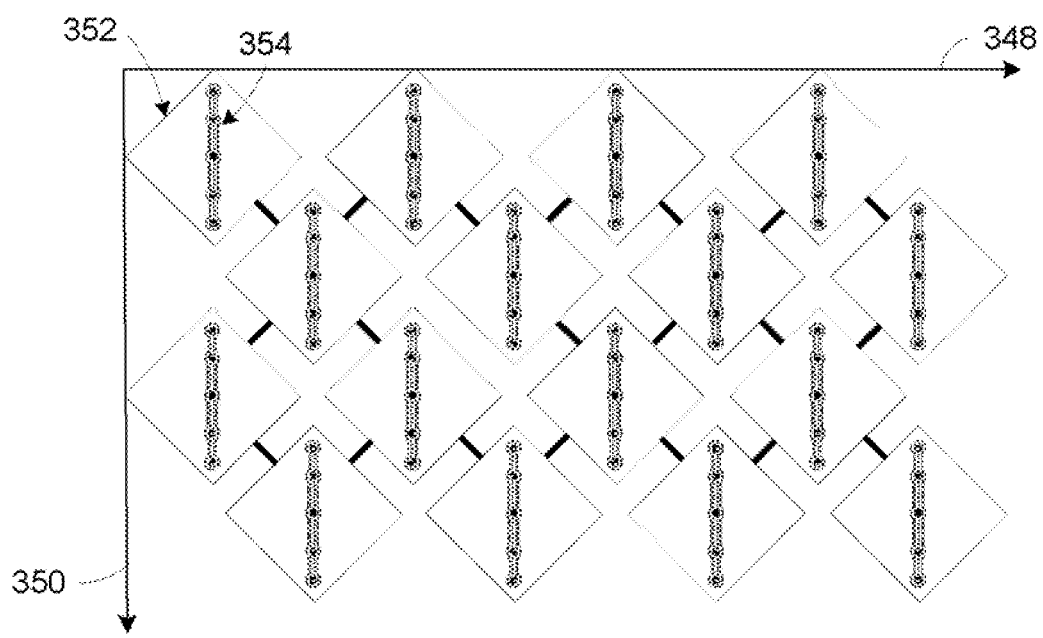
FIG. 25 schematically illustrates another exemplary arrangement of the micromirrors in the spatial light modulator of FIG. 23.

In an alternative configuration, each micromirror can be rotated an angle so as to form a diamond lattice, as schematically illustrated in FIG. 25. Referring to FIG. 25, straight lines 350 and 348 plot two major micromirror array edges. Each micromirror device in the array, such as micromirror device 352, is rotated along its center in the plane of the micromirror array by a specific angle, such as from 10° to 80° degrees, from 20° to 70° degrees, and more preferably around 45° degrees. Adjacent micromirror devices in each row of the micromirror array are connected through a micromirror device in the immediate next row (except the last row) as illustrated in the figure. Due to the rotated micromirror devices, the deformable hinge of each micromirror device can be parallel to a major edge of the micromirror array, such as deformable hinge 354 being parallel to edge 350.

The micromirror devices in a spatial light modulator are often enclosed within a package for protection purpose. An exemplary packaged micromirror array is schematically illustrated in FIG. 26.

Figure 26:
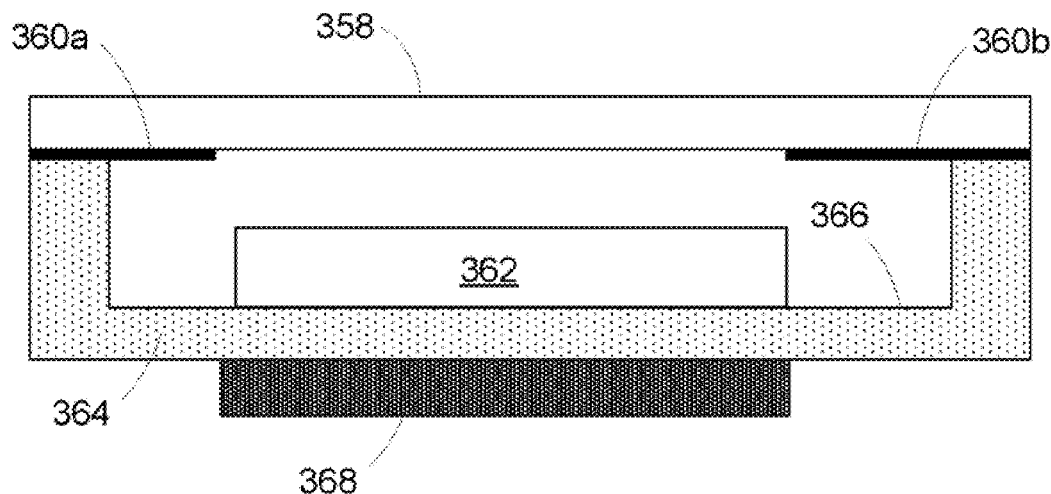
FIG. 26 illustrates a cross-sectional view of a micromirror device in a package, wherein the micromirror has a deformable hinge and a stabilizer.

Referring to FIG. 26, micromirror array 362 comprises an array of micromirror devices as discussed above. The micromirror array is attached to a supporting surface (366) of a cavity in package substrate 364, which can be composed of ceramic, plastic, polymer, or any other suitable materials. Package cover 358, which can be a substrate transmissive to the visible light (or ultraviolet or infrared light), is bonded to the package substrate so as to enclose the micromirror array (362) in the package. As an alternative feature, an aperture (360a and 360b) can be disposed so as to limiting the range of incident light into the package. A heat sink (368) can be attached to the package substrate for dissipating heat generated during the operation of the micromirror devices.

Figure 27:
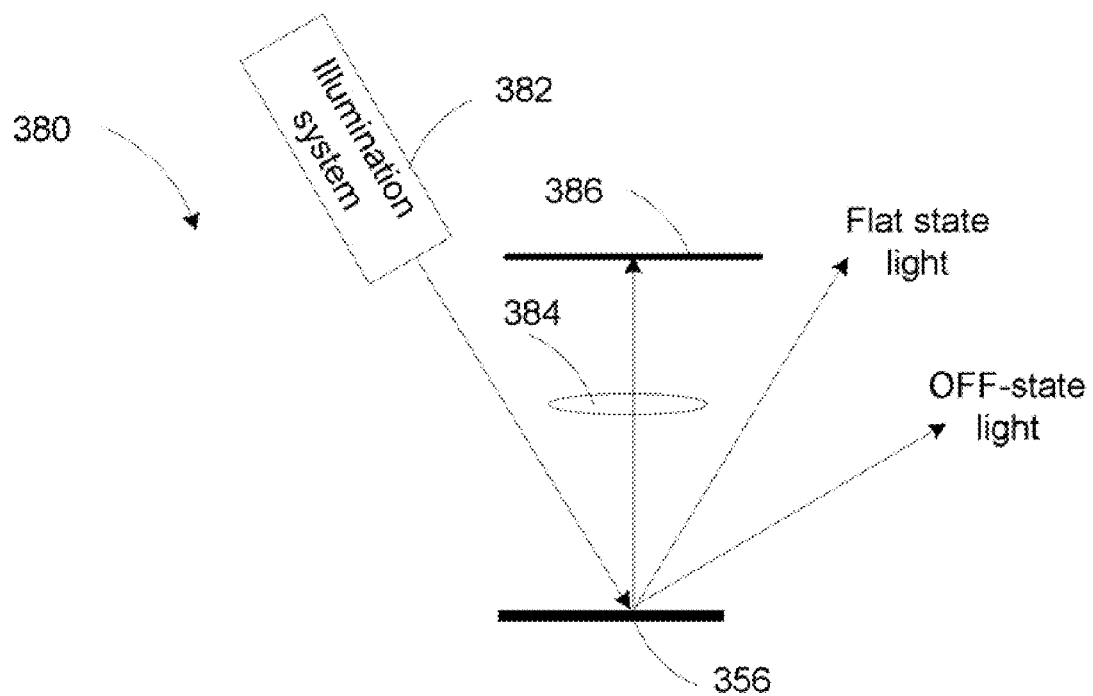
FIG. 27 schematically illustrates an exemplary display system having a spatial light modulator as illustrated in FIG. 23.

FIG. 27 schematically illustrates an exemplary imaging system that employs a spatial light modulator as discussed above. Referring to FIG. 27, imaging system 380 comprises illumination system 382, spatial light modulator 356, and alternative features of projection optics 384, and screen 386. The illumination system provides illumination light that travels towards the spatial light modulator. The spatial light modulator modulates the incident illumination light based on image data, such as bitplane data, derived from desired images to be produced. The modulated light is directed to the screen through projection optics 384 so as to form the desired image on the screen. As one example, an illumination system is schematically illustrated in FIG. 28.

Figure 28:
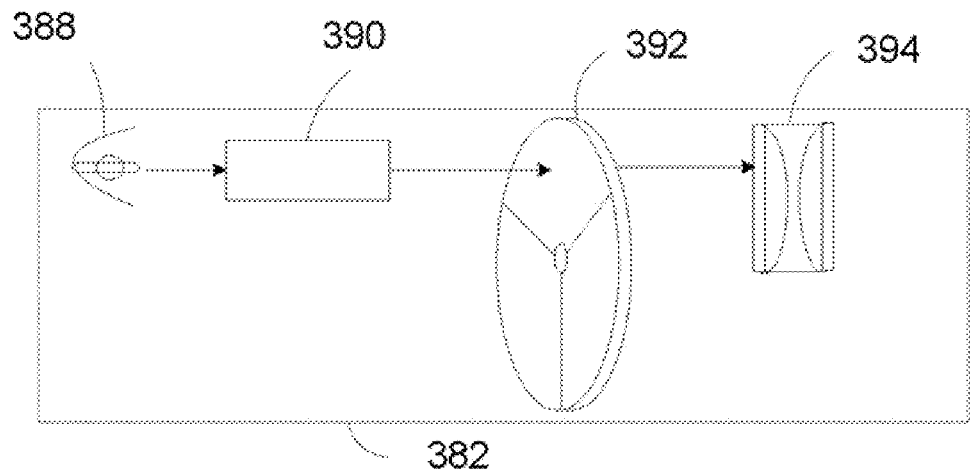
FIG. 28 schematically illustrates an exemplary illumination system for use in the display system as illustrated in FIG. 27.

Referring to FIG. 28, the illumination system comprises an arc lamp (388), light integrator 390, color filter 392, and optical element 394. The color filter, which can be a spinning color wheel, comprises multiple transmissive color segments, such as red, green, blue, yellow, cyan, magenta, white, and may have other desired colors. Optical element 394, which can be a condensing lens directs the color light after the color filter onto the spatial light modulator.

Figure 29:
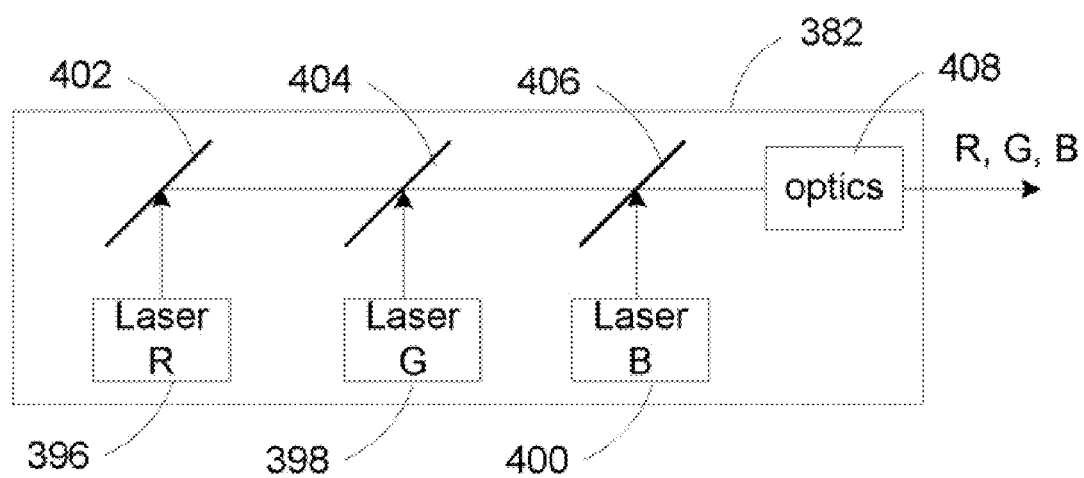
FIG. 29 schematically illustrates another exemplary illumination system for use in the display system as illustrated in FIG. 27.

The illumination system may use many other suitable illuminators for generating illumination light, such as solid-state illuminators (e.g. lasers and light-emitting-diodes). An alternative illumination system usable for the imaging system in FIG. 27 is schematically illustrated in FIG. 29. Referring to FIG. 29, illumination system 382 comprises laser R 396, laser G 398, and laser B 400 respectively for providing red, green, and blue colors of laser beams for the imaging system. The red, green, and blue laser beams are directed to the spatial light modulator of the imaging system along different optical paths, or along the same optical path as shown in FIG. 29. Specifically, red filter 402 capable of reflecting red color laser beams is disposed such that the reflected red laser beams from laser R propagates towards green filter 404 and blue filter 406. Green filter 404 passes the red laser beams from red filter 402 and reflects the green laser beams from laser G 398 toward blue filter 406. Blue filter 406 passes red and green laser beams incident thereto and reflects the blue laser beam from laser 400. As such, the red, green, and blue laser beams can be combined together.

Other optical components 408, such as diffusers, lenses, prisms, light integrators, and any suitable holographic optical elements with diffractive patterns can alternatively be included in illumination system 382 when necessary. For example, one or more beam deflectors with diffractive patterns can be provided for guiding the light beams from the illuminators towards the light valve assembly along desired directions. In another example, one or more diffractive beam-splitters or beam-dispersers can be provided for guiding different portions (e.g. portions of different characteristic wavelengths) of the light from the illuminators towards the spatial light modulator (or different spatial light modulators when employed in one imaging system) along different optical paths.

It will be appreciated by those of skill in the art that a new and useful method for improving the stability of a deformable element in MEMS devices has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A microelectromechanical device, comprising:
a substrate;
a deformable element held apart from the substrate such that the deformable element is capable of deforming apart from the substrate; and
a stabilizer attached to the deformable element at two or more points, the points connected by a portion of the stabilizer and separated by a portion of the deformable element that may deform separate from the stabilizer.

2. The device of claim 1, wherein the stabilizer is attached to the deformable element such that the stiffness of the deformable element deforming along or around a first direction is increased; and the stiffness of the deformable element deforming along or around a second direction is substantially not changed; wherein the first direction is along a length of the deformable hinge and the second direction is perpendicular to the length of the deformable hinge.

3. The device of claim 1, wherein the stabilizer is in a plane separate from the deformable element.

4. The device of claim 1, wherein the deformable element is a deformable hinge of a micromirror device that further comprises a reflective mirror plate that is attached to the deformable hinge.

5. The device of claim 4, wherein the stabilizer is substantially at a same plane as an electrode of the micromirror device, wherein the electrode is at a position elevated above the substrate of the micromirror device.

6. The device of claim 4, wherein the stabilizer is substantially at a different plane from an electrode of the micromirror device, wherein the electrode is at a position elevated above the substrate of the micromirror device.

7. The device of claim 4, wherein the stabilizer comprises a portion that is exposed to an area of an electrode formed on the substrate of the micromirror device such that an electrostatic field can be established between said portion of the stabilizer and said electrode.

8. The device of claim 4, wherein the stabilizer comprises a stabilizer frame or an elongated stabilizer plate.

9. The device of claim 1, wherein the deformable element is an elongated torsion hinge; and wherein the stabilizer is an elongated plate that is aligned to the deformable element such that the lengths of the deformable hinge and the stabilizer are substantially parallel.

10. The device of claim 1, wherein the deformable element is an elongated torsion hinge; and wherein the stabilizer is an elongated plate that is aligned to the deformable element such that the lengths of the deformable hinge and the stabilizer are substantially not parallel.

11. The device of claim 1, wherein the stabilizer is a plate that is attached to the deformable hinge by first and second posts; and wherein the first and second posts are disposed at the opposite sides of a mass center or a geometric center of the deformable hinge.

12. The device of claim 1, wherein a stiffness of the deformable element deforming in a direction is increased by the stabilizer, the direction along which the stiffness increases is one of a set of directions that comprises: a translational direction along a length of the deformable hinge, a translational direction along a width of the deformable hinge, a translational direction along a thickness of the deformable hinge, a rotational direction around an axis parallel to the length of the deformable hinge, a rotational direction around an axis parallel to the width of the deformable hinge, and a rotational direction around an axis parallel to the thickness of the deformable hinge.

13. A micromirror device, comprising:
a substrate on which an electrode pad is formed;
an elongated deformable hinge held apart from the substrate such that the deformable hinge is capable of deforming apart from the substrate;
a stabilizer attached to the deformable hinge at first and second attaching points on the deformable hinge, the attaching points connected by a portion of the stabilizer and separated by a portion of the deformable hinge that may deform separate from the stabilizer; and
a mirror plate attached to the deformable hinge at an attaching point such that the mirror plate is capable of rotating apart from the substrate.

14. The device of claim 13, wherein the first and second attaching points are substantially equally distanced and on opposite sides from the geometric center of the deformable hinge or from the attaching point at which the mirror plate is attached to the deformable hinge.

15. The device of claim 13, wherein the stabilizer is an elongated plate with a length substantially aligned to a length of the deformable hinge.

16. The device of claim 13, wherein the stabilizer is at a different plane from the deformable hinge.

17. The device of claim 13, wherein the stabilizer is substantially in the same plane as an electrode that is at a different plane from the electrode pad.

18. The device of claim 13, wherein the stabilizer comprises at least a portion that is exposed to the electrode pad such that an electrostatic field can be established between said electrode pad and said at least portion of the stabilizer.

19. The device of claim 13, wherein the stabilizer comprises a frame or first and second extensions that are disposed along the deformable hinge on opposite sides of the attaching point at which the mirror plate is attached to the deformable hinge.

20. A microelectromechanical system, comprising:
a substrate;
a deformable element held apart from the substrate such that the deformable element is capable of deforming apart from the substrate; and a stabilizing means for increasing a stiffness of the deformable element deforming along or around a first direction and substantially maintaining a stiffness of the deformable hinge deforming along or around a second direction, the stabilizing means attached to the deformable element at two or more points connected by a portion of the stabilizing means and separated by a portion of the deformable element that may deform separate from the stabilizer.

21. The system of claim 20, wherein the first and second deforming directions are in the same plane of the deformable element.

22. The system of claim 20, wherein the deformable element is a torsion hinge of a micromirror device that further comprises a reflective mirror plate that is attached to the deformable hinge such that the mirror plate is capable of rotating apart from the substrate.

23. A device, comprising:
a substrate having formed thereon an electrode;
a deformable hinge held apart from the substrate;
a reflective mirror plate attached to the deformable hinge such that said reflective portion is capable of moving relative to the substrate;
a stabilizer attached to the deformable hinge at two or more points connected by a portion of the stabilizer and separated by a portion of the deformable element that may deform separate from the stabilizer, the stabilizer increasing a stiffness of the deformable hinge deforming in a direction; and
a stopper disposed at a location such that said reflective mirror plate is stopped only by said stopper at a rotational position.

24. The device of claim 23, wherein the stabilizer comprises a plate, a frame, or first and second extensions that are disposed along the deformable hinge on opposite sides of the attaching point at which the mirror plate is attached to the deformable hinge.

25. An imaging system, comprising:
an illumination system providing illumination light;
a spatial light modulator comprising an array of micromirror devices, each of which comprises:
a substrate on which an electrode pad is formed;
an elongated deformable hinge held apart from the substrate such that the deformable hinge is capable of deforming apart from the substrate;
a stabilizer attached to the deformable hinge at first and second attaching points on the deformable hinge the points connected by a portion of the stabilizer and separated by a portion of the deformable hinge that may deform separate from the stabilizer; and
a mirror plate attached to the deformable hinge at an attaching point such that the mirror plate is capable of rotating apart from the substrate; and
a set of optical elements for directing the illumination light onto or away from the spatial light modulator.

* * * * *